US009476996B2

(12) United States Patent
Pica et al.

(10) Patent No.: US 9,476,996 B2
(45) Date of Patent: Oct. 25, 2016

(54) SYSTEM AND METHOD OF HIGH DEFINITION TOMOGRAPHY AND RESOLUTION FOR USE IN GENERATING VELOCITY MODELS AND REFLECTIVITY IMAGES

(71) Applicant: CGGVERITAS SERVICES SA, Massy (FR)

(72) Inventors: Antonio Pica, Vanves (FR); Patrice Guillaume, Orsay (FR); Gilles Lambare, Saint Fargeau Ponthierry (FR)

(73) Assignee: CGG SERVICES SA, Massy (FR)

( * ) Notice: Subject to any disclaimer, the term of this patent is extended or adjusted under 35 U.S.C. 154(b) by 649 days.

(21) Appl. No.: 13/906,879

(22) Filed: May 31, 2013

(65) Prior Publication Data

US 2013/0322212 A1 Dec. 5, 2013

Related U.S. Application Data

(60) Provisional application No. 61/654,211, filed on Jun. 1, 2012.

(51) Int. Cl.
*G01V 1/30* (2006.01)

(52) U.S. Cl.
CPC .................. *G01V 1/303* (2013.01)

(58) Field of Classification Search
CPC .......... G01V 1/30; G01V 1/303; G01V 1/28; G01V 1/34; G01V 1/38
USPC .......................................... 367/38
See application file for complete search history.

(56) References Cited

U.S. PATENT DOCUMENTS

| 4,210,968 | A | * | 7/1980 | Lindseth | G01V 1/303 367/46 |
|---|---|---|---|---|---|
| 5,850,622 | A | * | 12/1998 | Vassiliou | G01V 1/32 367/46 |
| 2006/0203613 | A1 | * | 9/2006 | Thomsen | G01V 3/083 367/38 |
| 2007/0286019 | A1 | * | 12/2007 | Love | G01V 1/005 367/25 |
| 2010/0074053 | A1 | * | 3/2010 | Jaiswal | G01V 1/303 367/73 |

(Continued)

FOREIGN PATENT DOCUMENTS

GB 2479990 A 11/2011

OTHER PUBLICATIONS

Dragoset—Reservoir imaging using low frequencies of seismic reflections, May 2006.*

(Continued)

*Primary Examiner* — Luke Ratcliffe
*Assistant Examiner* — Amienatta M Ndure Jobe
(74) *Attorney, Agent, or Firm* — Patent Portfolio Builders PLLC

(57) ABSTRACT

A system and method are provided for determining a broadband high definition reflectivity based image for a geographical area of interest (GAI). The system and method generate a conventional reflectivity image based on acquired seismic data for the GAI, generate a high frequency (HF) velocity model of the GAI based on the acquired seismic data, convert the HF velocity model into a low frequency (LF) reflectivity image, and adaptively merge the LF reflectivity image with the conventional reflectivity image to form the broadband HD reflectivity image of the GAI.

28 Claims, 40 Drawing Sheets

(56) References Cited

U.S. PATENT DOCUMENTS

| | | | | |
|---|---|---|---|---|
| 2010/0265797 | A1* | 10/2010 | Robertsson | G01V 1/366 367/43 |
| 2010/0286919 | A1* | 11/2010 | Lee | G01V 1/28 702/16 |
| 2011/0042098 | A1* | 2/2011 | Imhof | G01V 1/30 166/369 |
| 2011/0218737 | A1* | 9/2011 | Gulati | G01V 1/28 702/16 |
| 2011/0267921 | A1* | 11/2011 | Mortel | G01V 1/28 367/25 |
| 2011/0292761 | A1 | 12/2011 | Jiao et al. | |
| 2011/0295510 | A1* | 12/2011 | Gulati | G01V 1/28 702/16 |
| 2012/0025099 | A1* | 2/2012 | Yelin | G01J 3/10 250/459.1 |
| 2012/0163121 | A1* | 6/2012 | Hardage | G01V 1/286 367/21 |

OTHER PUBLICATIONS

English Translation of Search Report and Written Opinion in corresponding Singapore Application No. 2013042924 dated Dec. 19, 2014.

Billette F., et al., "Practical aspects and application of 2D stereotomography", Geophysics, vol. 68, No. 3, pp. 1008-1021, May-Jun. 2003.

Claerbout, J., "Imaging the Earth's Interior (IEI)", retrieved on Apr. 7, 2013, from http://sepwww.stanford.edu/sep/prof/iei/toc_hyml/.

Dalfsen, W. Van, "A Comprehensive Seismic Velocity Model for the Netherlands based on Lithostratigraphic Layers", Netherlands Journal of Geosciences, vol. 85, No. 4, pp. 277-292, 2006.

Guillaume, P., et al., "3D finite-offset tomographic inversion of CRP-scan data, with or without anisotropy", 71st annual SEG meeting, San Antonio, Texas, SEG Expanded Abstracts 20, pp. 718-721, Sep. 9-14, 2001.

Guillaume, P., et al., "Geologically consistent velocities obtained by high definition tomography", 81st annual SEG San Antonio 2011 meeting, SEG Exp. Abstracts 30, pp. 4061-4065, 2011.

Guillaume, P., et al., "Kinematic invariants: an efficient and flexible approach for velocity model building", 78th annual SEG meeting, SEG workshop "Advanced velocity model building techniques for depth imaging", Las Vegas, NV, 2008.

Lambaré, G., "Stereotomography", Geophysics, vol. 73, No. 5, pp. VE25-VE34, Sep.-Oct. 2008.

Liu, Z., "An analytical approach to migration velocity analysis", Geophysics vol. 62, No. 4, pp. 1238-1249, Jul.-Aug. 1997.

Martin, G. S., et al., "Marmousi 2: An elastic upgrade for Marmousi", The Leading Edge 25, pp. 156-166, Feb. 2006.

Plessix, R.E., et al., "Application of acoustic full waveform inversion to a low-frequency large-offset land data set", 81st annual SEG meeting, Denver CO. SEG, pp. 930-934, 2010.

Siliqi R., et al., "Structurally coherent Wide Azimuth Residual Move Out surfaces", 79th annual SEG meeting, Houston TX, pp. 4039-4043, 2009.

Traonmilin, Y., et al., "Multi-dip Estimation in 'N' Dimensions", EAGE 71st Conference & Exhibition, Amsterdam, The Netherlands, Jun. 8-11, 2009.

Woodward, M., et al., "Automated 3D Tomographic Velocity Analysis of Residual Move-out in Pre-stack Depth Migrated Common Image Point Gathers," 68th Annual International Meeting, SEG, Expanded Abstracts, pp. 1218- 1221, 1998.

Search and Examination Report in corresponding Singapore Application No. 2013042924 dated Sep. 15, 2015.

* cited by examiner

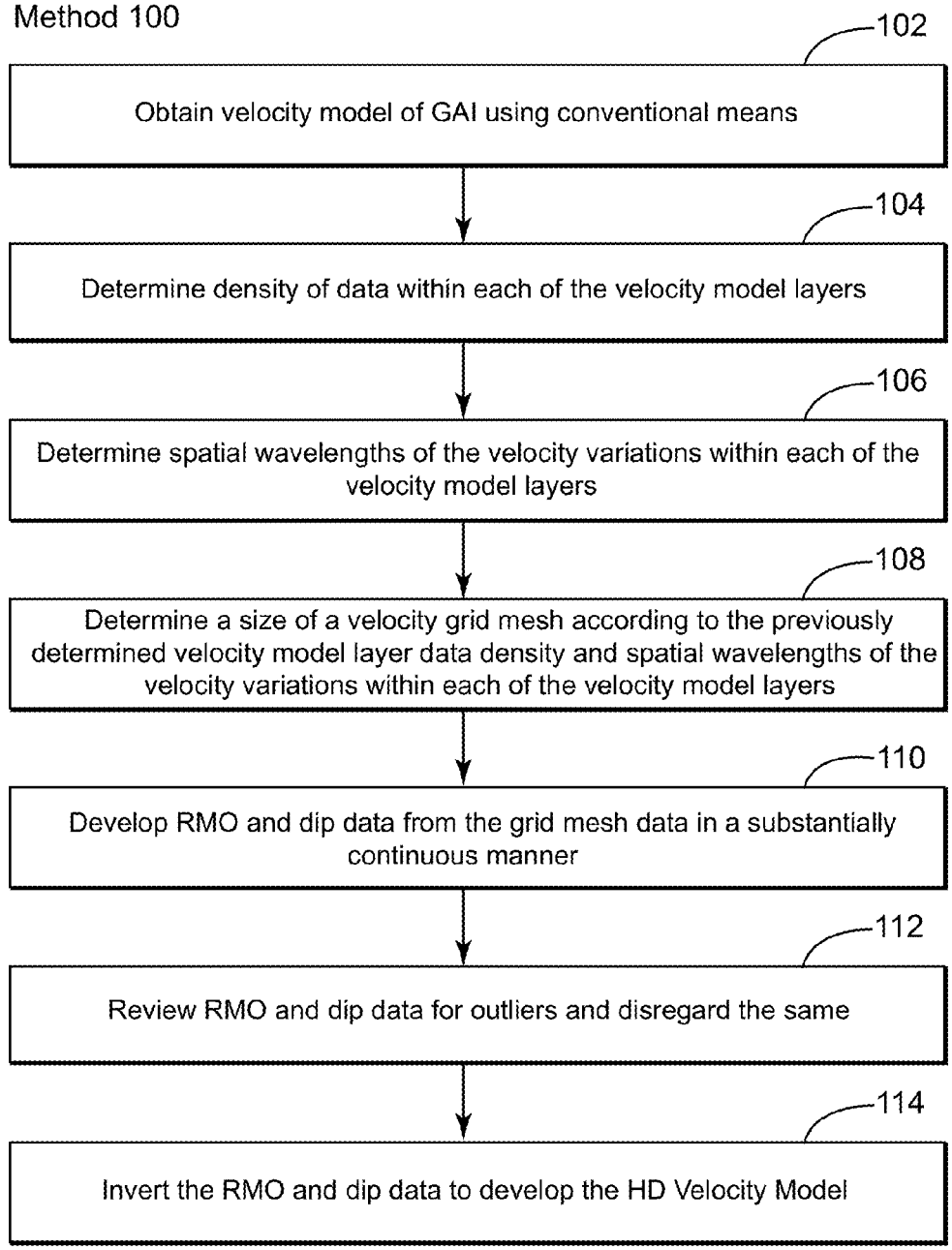

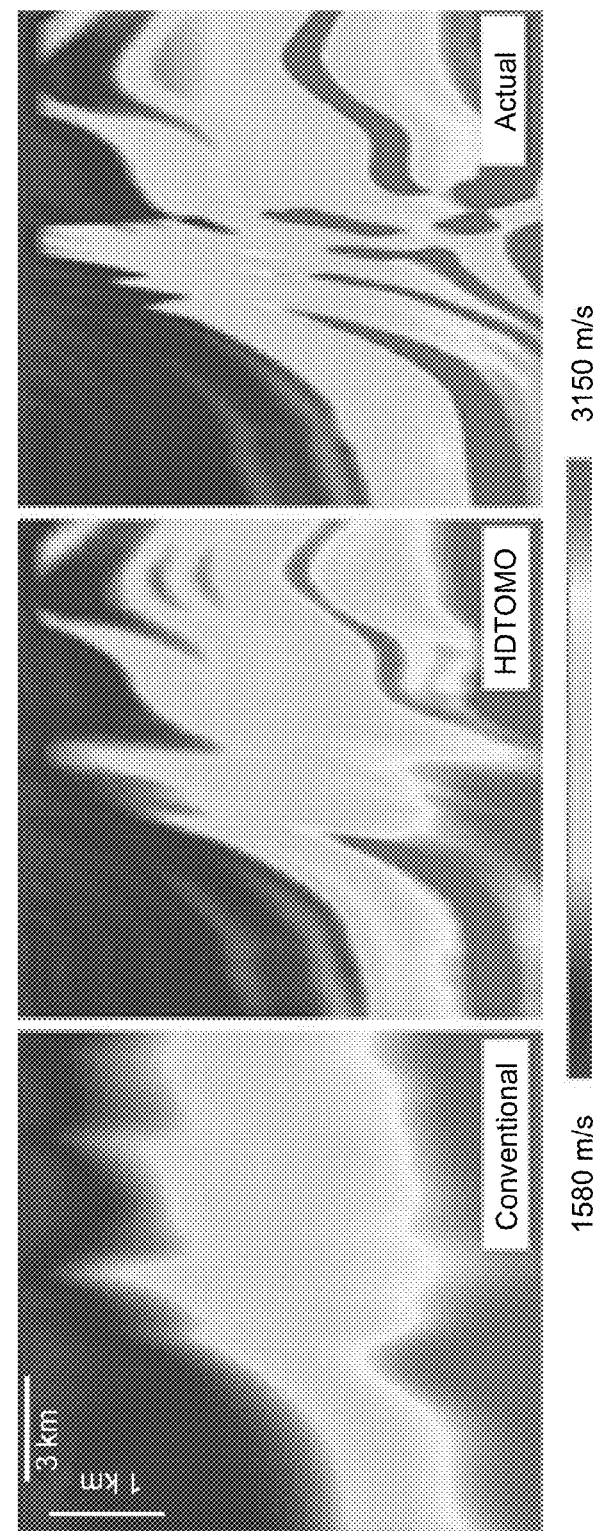

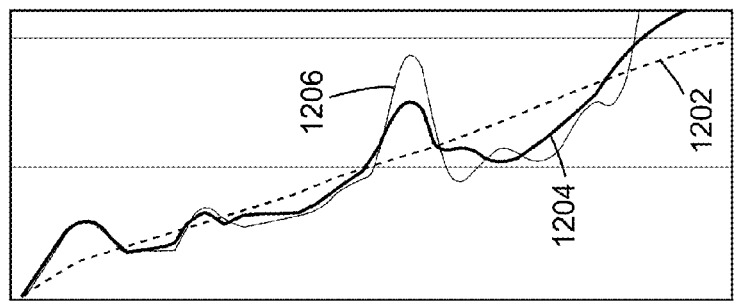
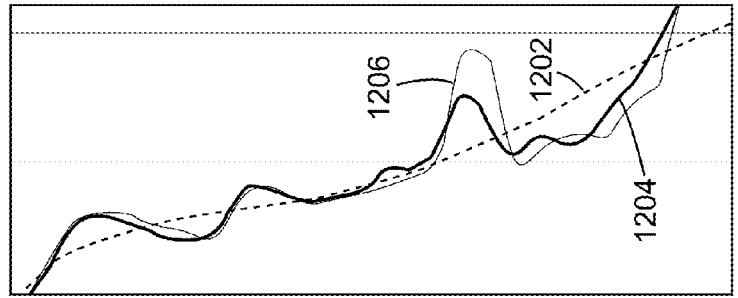
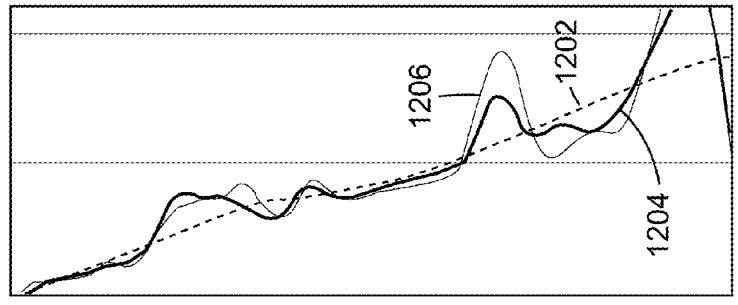
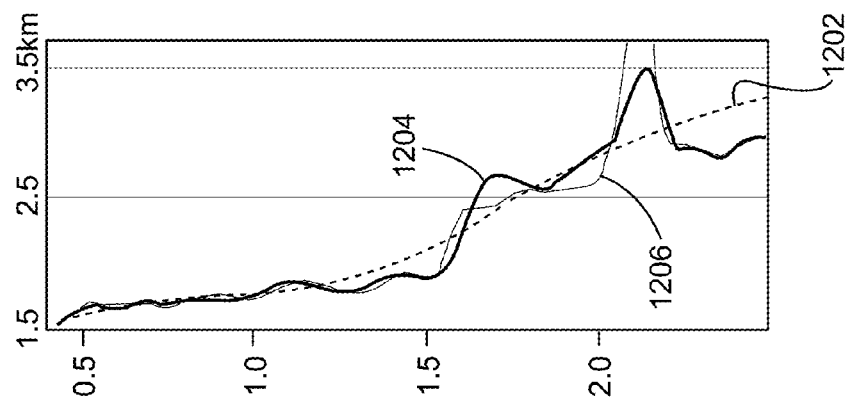

Figure 15
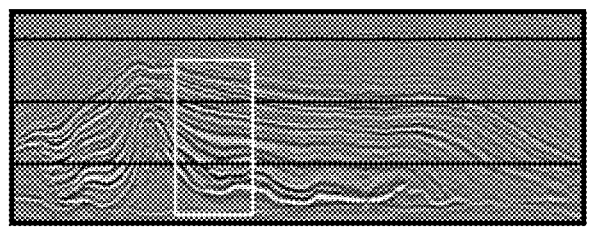
Figure 16A    Figure 16B
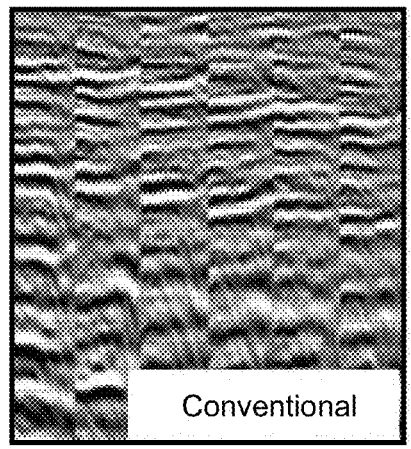
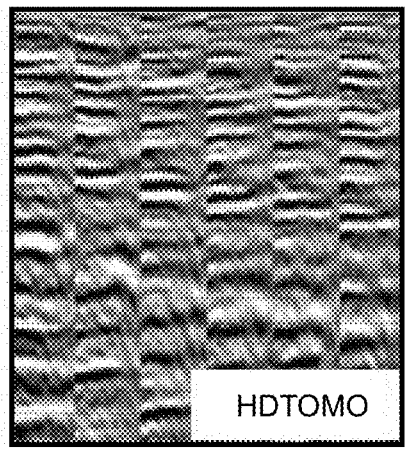

SYSTEM AND METHOD OF HIGH DEFINITION TOMOGRAPHY AND RESOLUTION FOR USE IN GENERATING VELOCITY MODELS AND REFLECTIVITY IMAGES

PRIORITY INFORMATION

The present application claims priority under 35 U.S.C. §119(e) to U.S. Provisional Patent Application Ser. No. 61/654,211, filed 1 Jun. 2012, the entire contents of which are expressly incorporated herein by reference.

TECHNICAL FIELD

The embodiments relates generally to both land and marine seismic exploration, and more specifically to systems and methods for using high definition tomography to develop enhanced velocity models.

BACKGROUND

A widely used technique for searching for oil or gas is the seismic exploration of subsurface geophysical structures. Reflection seismology is a method of geophysical exploration to determine the properties of a portion of a subsurface layer in the earth, which information is especially helpful in the oil and gas industry. Marine-based seismic data acquisition and processing techniques are used to generate a profile (image) of a geophysical structure (subsurface) of the strata underlying the seafloor. This profile does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process.

The seismic exploration process consists of generating seismic waves (i.e., sound waves) directed toward the subsurface area, gathering data on reflections of the generated seismic waves at interfaces between layers of the subsurface, and analyzing the data to generate a profile (image) of the geophysical structure, i.e., the layers of the investigated subsurface. This type of seismic exploration can be used both on the subsurface of land areas and for exploring the subsurface of the ocean floor.

Marine reflection seismology is based on the use of a controlled source that sends energy waves into the earth, by first generating the energy waves in or on the ocean. By measuring the time it takes for the reflections to come back to one or more receivers (usually very many, perhaps in the order of several dozen, or even hundreds), it is possible to estimate the depth and/or composition of the features causing such reflections. These features may be associated with subterranean hydrocarbon deposits.

For a seismic gathering process, as shown in FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4a,b may be also towed by ship 2 or another ship for generating seismic waves. Source arrays 4a,b can be placed either in front of or behind receivers 14 (shown in FIG. 2), or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. This process is generally referred to as "shooting" a particular seafloor area, and the seafloor area can be referred to as a "cell".

FIG. 2 illustrates a side view of the data acquisition system 10 of FIG. 1. Ship 2, located on ocean surface 46 of ocean water 40, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the principles involved, only a first transmitted signal 20a will be discussed in detail (even though some or all of source 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction n1 and meets with a different medium, with a second index of refraction n2, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44. As further seen in FIG. 2, second refracted signal 32a encounters hydrocarbon deposit 44, at third refraction/reflection point 34a, generating third refracted signal 38a, and third reflected signal 36a. Further, second transmitted signal 20b generates first reflected and refracted signals (from second transmitted signal) 24b, and 26b, respectively, at first reflection/refracting point 22b. Second refracted signal 26b encounters solid earth/rock layer 18 at second reflection/refraction point 28b, thereby generating second reflected signal 30b, and second refracted signal 32b. Second refracted signal 32b travels through second layer 18 and encounters hydrocarbon deposit 44 and third reflection/refraction point 34b, and generates third reflected signal 36b and third refracted signal 38b. As those of skill in the art can appreciate, though it appears that this process can continue ad infinitum, such may be technically true and possible, but with each reflection/refraction, only a certain percentage of the energy from the impinging signal is reflected and refracted, and so the strength of the signal diminishes quickly, and can, in fact, after only a few encounters with such interfaces, diminish to the point that the sensitivity of receivers 14 is not large enough to distinguish the signals over other noise in the system. Nonetheless, it is an important part of seismic signal processing to discern different refracted/reflected signals from the noise to the greatest extent possible.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples, and more strictly, are events that have undergone more than one reflection. Typically, multiples have a much smaller amplitude than primary reflected waves, because for each reflection, the amplitude decreases proportionally to the product of the reflection coefficients of the different reflectors (usually layers or some sort). As shown in FIG. 3, discussed below, there are several ways for multiples to be generated.

As illustrated in FIG. 3, seismic source 4 produces first transmitted wave 20a that splits into a primary transmitted wave 26a (referred to also as first refracted signal) penetrating inside first subsurface layer 16 (referred to also as "sediment layer" though that does not necessarily need to be the case) under ocean floor 42, and first reflected signal 24a that becomes surface multiple signal 50 after it interfaces with ocean surface 46 (or fourth interface). Second transmitted wave 20b is reflected once at second interface 48 and becomes second reflected signal 24b, and then is reflected down again from ocean floor 42 to become internal multiple signal 51. Internal multiple signal 51 and surface multiple signal 50 also reaches receiver 14, but at different times. Thus, receiver 14 can receive at least several different signals from the same transmitting event: second reflected signal 30a, surface multiple signal 50, and internal multiple signal 51. Multiples can also be classified as short path multiples, and long path multiples (e.g., surface multiples and internal multiples). Short path multiples are those whose travel path is short compared to the primary reflections, and long path multiples are those whose travel path is long compared to the primary reflections. One type of short path multiples include ghosts 52, in which the seismic energy or wave is transmitted upwards first towards a reflecting boundary layer, then down, and up again to the receiver. As seen in FIG. 3, ghost 52 leaves source 4, travels upwards and reflects nearly perfectly off ocean surface 46, then down to ocean floor 42, and up to receiver 14. Because of the near perfect reflectivity of ocean surface 46, the magnitude of ghosts 52 rivals that of "true" reflected signals 24 and thus are typically very important to marine seismic exploration. As such, ghosts 52 can be very strong.

As is apparent from FIG. 3, the timing of the received signals will depend on the depth of the ocean 40, its temperature, density, and salinity, the depth of sediment layer 16, and what it is made of. Thus, receiver 14 can become "confused" as to the true nature of the subsurface environment due to reflected signals 30, and multiple signals 50, 51, and 52. As briefly discussed above, other multiples can also be generated, some of which may also travel through the subsurface. A multiple, therefore, is any signal that is not a primary reflected signal. Multiples, as is known by those of ordinary skill in the art, can cause problems with determining the true nature of the geology of the earth below the ocean floor. Multiples can be confused by data acquisition system 10 with first, second or third reflected signals. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits.

Internal multiple signals 51 typically arise due to a series of subsurface impedance contrasts. They are commonly observed in seismic data acquired in various places, such as the Santos Basin of Brazil. They are often poorly discriminated from the primaries (i.e., the first, second and third reflected signals, among others), because they have similar movement, dips and frequency bandwidth, thereby making attenuation and/or elimination of internal multiple signals 51 (as well as surface multiples 50) one of the key issues in providing clear seismic images in interpreting areas of interest. Over time, various methods have been developed to address this difficult problem and most of them rely on the ability to identify the multiple generators.

The acquisition of data in marine-based seismic methods usually produces different results in source strength and signature based on differences in near-surface conditions. Further data processing and interpretation of seismic data requires correction of these differences in the early stages of processing. Surface-Related Multiples Elimination (SRME) is a technique commonly used to predict a multiples model from conventional flat streamer data. Attenuating the surface-related multiples is based on predicting a multiples model, adapting the multiples model and subtracting the adapted multiples model from the input streamer data.

FIG. 39 depicts schematically a land seismic exploration system (system) 70 for transmitting and receiving vibro-seismic waves intended for seismic exploration in a land environment. At least one purpose of system 70 is to determine the absence, or presence of hydrocarbon deposits 44, or at least the probability of the absence or presence of hydrocarbon deposits 44. System 70 comprises a source consisting of a vibrator 71 (source and vibrator being interchangeable terms for the same device) operable to generate a seismic signal (transmitted waves), a plurality of receivers 72 (or geophones) for receiving seismic signals and converting them into electrical signals, and seismic data acquisition system 200' (that can be located in, for example, vehicle/truck 73) for recording the electrical signals generated by receivers 72. Source 71, receivers 72, and data acquisition system 200', can be positioned on the surface of ground 75, and all interconnected by one or more cables 72. FIG. 39 further depicts a single vibrator 71, but it should be understood that source 71 can actually be composed of multiple or a plurality of sources 71, as is well known to persons skilled in the art. As can be further appreciated by those of skill in the art, land related acquisition methods include all land acquisition methods, and in particular land acquisition schemes where receivers and sources (natural or man-made) can be either on or close to the surface (topography) or in the subsurface (in particular along well paths).

In operation, source 71 is operated so as to generate a vibro-seismic signal. This signal propagates firstly on the surface of ground 75, in the form of surface waves 74, and secondly in the subsoil, in the form of transmitted ground waves 76 that generate reflected waves 78 when they reach an interface 77 between two geological layers. Each receiver 72 receives both surface wave 74 and reflected wave 76 and converts them into an electrical signal in which are superimposed the component corresponding to reflected wave 78 and the one that corresponds to surface wave 74, the latter of which is undesirable and should be filtered out as much as is practically possible.

An example of a vibratory source 71 is shown in FIG. 40. Source 71 can include base plate 88 that connects to rod 80. Rod 80 includes piston 82 inside reaction mass 84. Insulation devices 86 can be provided on base plate 88 to transmit weight 90 of vehicle 73 to base plate 88. Base plate 88 is shown in FIG. 40 as lying on ground 75. The force transmitted to ground 75 is equal to the mass of base plate 88 times its acceleration, plus the weight of reaction mass 84 times its acceleration. The weight of vehicle 73 (shown in FIG. 39) prevents base plate 88 from losing contact with ground 75. Many designs for vibratory sources 71 exist on the market, and any one of them can be used with the novel features discussed herein.

Velocity model building remains a crucial step in seismic depth imaging for both land and marine seismic imaging. As those of ordinary skill in the art can appreciate, in order to provide a representative image of the geographical area of interest (GAI), i.e., in order to properly interpret the seismic waves to provide accurate seismic images, it is necessary to have a well-defined velocity model of the general area. However, in order to create a well-defined velocity model of the general area, it is also sometimes, perhaps always, necessary to have an accurate description of the geological physical structures in the area; this presents the classic problem of what is developed first, and how can it be trusted to provide the correct information? A general drawback of conventional tomographic approaches is that the estimated velocity models do not conform enough to the structures (i.e., the geological physical structures underwater and/or underground, including even different layers of subsurface areas).

There are certain problems, however, with determining accurate velocity models using current methods and system, especially when knowledge of the underwater and/or underground structures is not known. Accordingly, it would be desirable to provide methods, modes and systems for using high definition tomography to develop enhanced velocity models for geographical areas of interest.

SUMMARY

An object of the embodiments is to substantially solve at least one or more of the problems and/or disadvantages discussed above, and to provide at least one or more of the advantages described below.

It is therefore a general aspect of the embodiments to provide a system and method for determining a broadband high definition reflectivity based image for a geographical area of interest that will obviate or minimize problems of the type previously described.

According to a first aspect of the embodiments, a method is provided for determining a broadband high definition reflectivity based image for a geographical area of interest (GAI), the method comprising generating a conventional reflectivity image based on acquired seismic data for the GAI, generating a high frequency (HF) velocity model of the GAI based on the acquired seismic data, converting the HF velocity model into a low frequency (LF) reflectivity image, and adaptively merging the LF reflectivity image with the conventional reflectivity image to form a broadband HD reflectivity image of the GAI.

According to the first aspect, the conventional reflectivity image is bandwidth limited, the LF reflectivity image is a PreStack Depth Migration image, and the LF reflectivity image can also be a PreStack Time Migration image. Still further according to the first aspect, the steps of generating a convention reflectivity image and generating a HF velocity model include generating a series of seismic signals by a plurality of source transmitters, and receiving raw data at a plurality of receivers based on the generated series of seismic signals and saving the same as said acquired seismic data.

According to the first aspect, the step of adaptively merging comprises determining amplitude as a function of frequency for the LF reflectivity image to create a first spectral signal, determining amplitude as a function of frequency for the conventional reflectivity image to a create a second spectral signal, determining portions of overlapping frequency between the LF reflectivity image and the conventional reflectivity image with respect to the first and second spectral signals, and combining said first and second spectral images in said overlapping frequency portions along with said first and second spectral images in non-overlapping frequency portions to generate said broadband HD reflectivity image.

According to the first aspect, the step of adaptively merging comprises combining the LF reflectivity image and the conventional reflectivity image using spectral balancing techniques, and the step of combining comprises summing the LF reflectivity image and the conventional reflectivity image in the frequency range wherein an overlap occurs in regard to a spectral content of each of the LF reflectivity image and the conventional reflectivity image.

According to the first aspect, the step of summing comprises determining amplitude as a function of frequency for the LF reflectivity image to create a first spectral signal, determining amplitude as a function of frequency for the conventional reflectivity image to a create a second spectral signal, performing spectral shaping of the first spectral signal and of the second spectral signal to enable summation of the first and second spectral signals, geometrical shaping the LF reflectivity image and the conventional reflectivity image to further facilitate summation of the LF reflectivity image and the conventional reflectivity image, and summing the LF reflectivity image and the conventional reflectivity image based on the outputs of the spectral shaping and warping steps. Still further according to the first aspect, the step of geometric shaping comprises compensating at least one of or both time and space variant differences in the LF reflectivity image and conventional reflectivity image in order to sum the LF reflectivity image and the conventional reflectivity image.

According to the first aspect, the step of spectral shaping comprises determining a regularity of properties of a combined signal and using said determined regularity to combine the LF reflected image and the conventional reflectivity image that have different phase and amplitude spectra. According to the first aspect, the step of geometrical shaping comprises image shaping the LF reflectivity image and the conventional reflectivity image using at least one of warping, shaping, and morphing. Still further according to the first aspect, the step of generating a high frequency (HF) velocity model of the GAI based on the acquired seismic data comprises obtaining a conventional velocity model of the GAI using said acquired seismic data, determining density of the conventional velocity model data, determining spatial wavelengths of the velocity variations within each of the velocity model layers, determining a size of the velocity model grid mesh according to the determined velocity model layer data density and spatial wavelengths of the velocity variations within each of the velocity model layers, developing residual move out data and dip data from the velocity model grid mesh according to the size of the velocity model grid mesh, eliminating residual move out and dip data outliers that exceed a first parameter to generate a first set of retained residual move out and dip data, and inverting the first set of retained residual move out and dip data to generate the HF velocity model of the GAI.

According to the first aspect, the method still further comprises displaying the broadband HD reflectivity image of the GAI.

According to a second aspect of the embodiments, a system is provided for determining a broadband high definition reflectivity based image for a geographical area of interest (GAI), the system comprising a processor configured to—generate a conventional reflectivity image based on acquired seismic data for the GAI, generate a high frequency (HF) velocity model of the GAI based on the acquired seismic data, convert the HF velocity model into a low frequency (LF) reflectivity image, and adaptively merge the LF reflectivity image with the conventional reflectivity image to form a broadband HD reflectivity image of the GAI.

According to the second aspect, the conventional reflectivity image is bandwidth limited, the LF reflectivity image is a PreStack Depth Migration image, and the LF reflectivity image can also be a PreStack Time Migration image.

According to the second aspect, the system further comprises a plurality of transmitters configured to generate a series of seismic signals, a plurality of receivers configured to receive raw data based on the generated series of seismic signals, and a memory configured to save the received raw data as said acquired seismic data.

According to the second aspect, the system is further configured to determine amplitude as a function of frequency for the LF reflectivity image to create a first spectral signal, determine amplitude as a function of frequency for the conventional reflectivity image to a create a second spectral signal, determine portions of overlapping frequency between the LF reflectivity image and the conventional reflectivity image with respect to the first and second spectral signals, and combine said first and second spectral images in said overlapping frequency portions along with said first and second spectral images in non-overlapping frequency portions to generate said broadband HD reflectivity image.

According to the second aspect, the system is further configured to combine the LF reflectivity image and the conventional reflectivity image using spectral balancing techniques. Still further according to the second aspect, the processor is further configured to sum the LF reflectivity image and the conventional reflectivity image in the frequency range wherein an overlap occurs in regard to a spectral content of each of the LF reflectivity image and the conventional reflectivity image.

According to the second aspect, the processor is further configured to determine amplitude as a function of frequency for the LF reflectivity image to create a first spectral signal, determine amplitude as a function of frequency for the conventional reflectivity image to a create a second spectral signal, perform spectral shaping of the first spectral signal and of the second spectral signal to enable summation of the first and second spectral signals, geometrically shape the LF reflectivity image and conventional reflectivity image to further facilitate summation of the LF reflectivity image and the conventional reflectivity image, and sum the LF reflectivity image and the conventional reflectivity image based on the outputs of the spectral shaping and warping steps.

According to the second aspect, the processor is further configured to compensate at least one of or both time and space variant differences in the LF reflectivity image and conventional reflectivity image in order to sum the LF reflectivity image and the conventional reflectivity image, and still further according to the second aspect, the processor is further configured to determine a regularity of properties of a combined signal and using said determined regularity to combine the LF reflected image and the conventional reflectivity image that have different phase and amplitude spectra. According to the second aspect, the processor is further configured to image shape the LF reflectivity image and the conventional reflectivity image using at least one of warping, shaping, and morphing.

According to the second aspect, the processor is further configured to obtain a conventional velocity model of the GAI using said acquired seismic data, determine density of the conventional velocity model data, determine spatial wavelengths of the velocity variations within each of the velocity model layers, determine a size of the velocity model grid mesh according to the determined velocity model layer data density and spatial wavelengths of the velocity variations within each of the velocity model layers, develop residual move out data and dip data from the velocity model grid mesh according to the size of the velocity model grid mesh, eliminate residual move out and dip data outliers that exceed a first parameter to generate a first set of retained residual move out and dip data, and invert the first set of retained residual move out and dip data to generate the HF velocity model of the GAI.

According to the second aspect, the system further comprises a display configured to display the broadband HD reflectivity image of the GAI,

BRIEF DESCRIPTION OF THE DRAWINGS

The above and other objects and features of the embodiments will become apparent and more readily appreciated from the following description of the embodiments with reference to the following figures, wherein like reference numerals refer to like parts throughout the various figures unless otherwise specified, and wherein:

FIG. 7 illustrates a flowchart of a method for determining a high definition velocity model according to an embodiment;

FIG. 8 illustrates a non-linear slope tomography velocity model determined according to conventional methods using well-known Marmousi II synthetic data;

FIG. 9 illustrates a HD velocity model using well-known Marmousi II synthetic data determined in accordance with the method according to an embodiment described herein;

FIG. 10 illustrates an actual velocity model based on the well-known Marmousi II synthetic data;

FIGS. 12A-D illustrate comparisons of the velocity model data profile at four locations in the superimposed diagram of FIG. 11;

FIG. 15 illustrates a common image gather of a different marine geographical area of interest and which identifies in a white box areas of interest from which the common image gathers in FIG. 16 are extracted;

FIG. 16A illustrates a close up view of the common image gathers in the box of FIG. 15 prior to implementation of the method according to an embodiment, and FIG. 16B illustrates a close up view of the common image gathers in the box of FIG. 15 following implementation of the method according to an embodiment;

DETAILED DESCRIPTION

Figure 1:
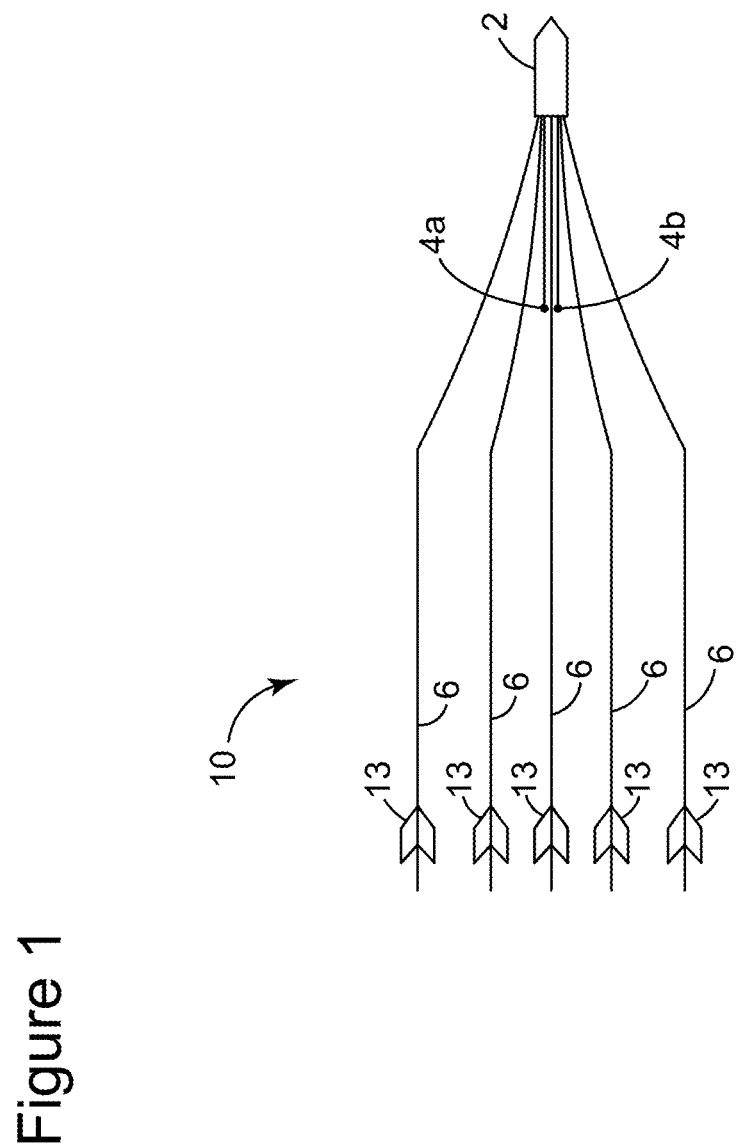
FIG. 1 illustrates a top view of a data acquisition system for use in an underwater seismic gathering process.
Figure 2:
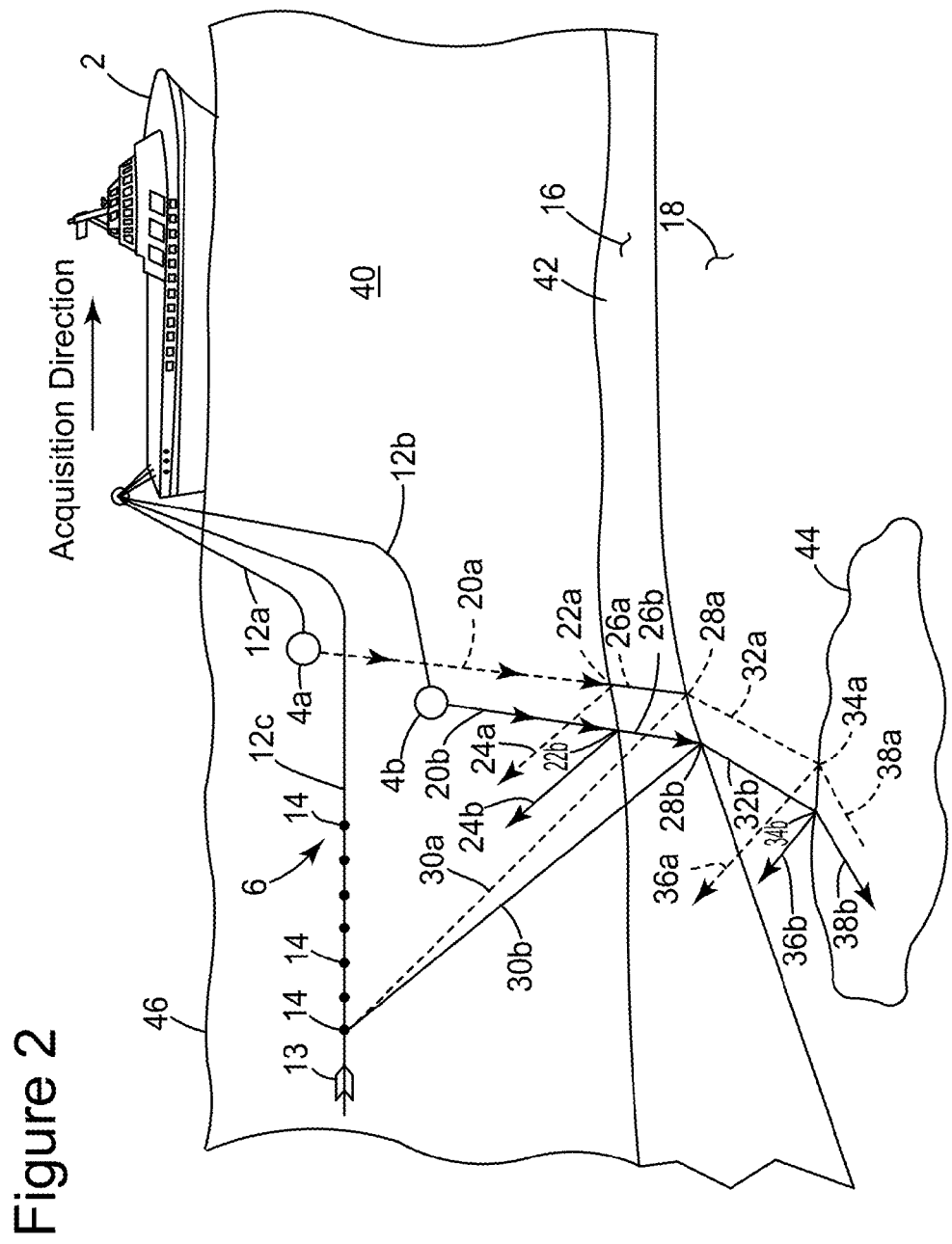
FIGS. 2 and 3 illustrate a side view of the data acquisition system of FIG. 1 and pictorially represent transmitted, reflected, refracted and multiples sound waves.
Figure 3:
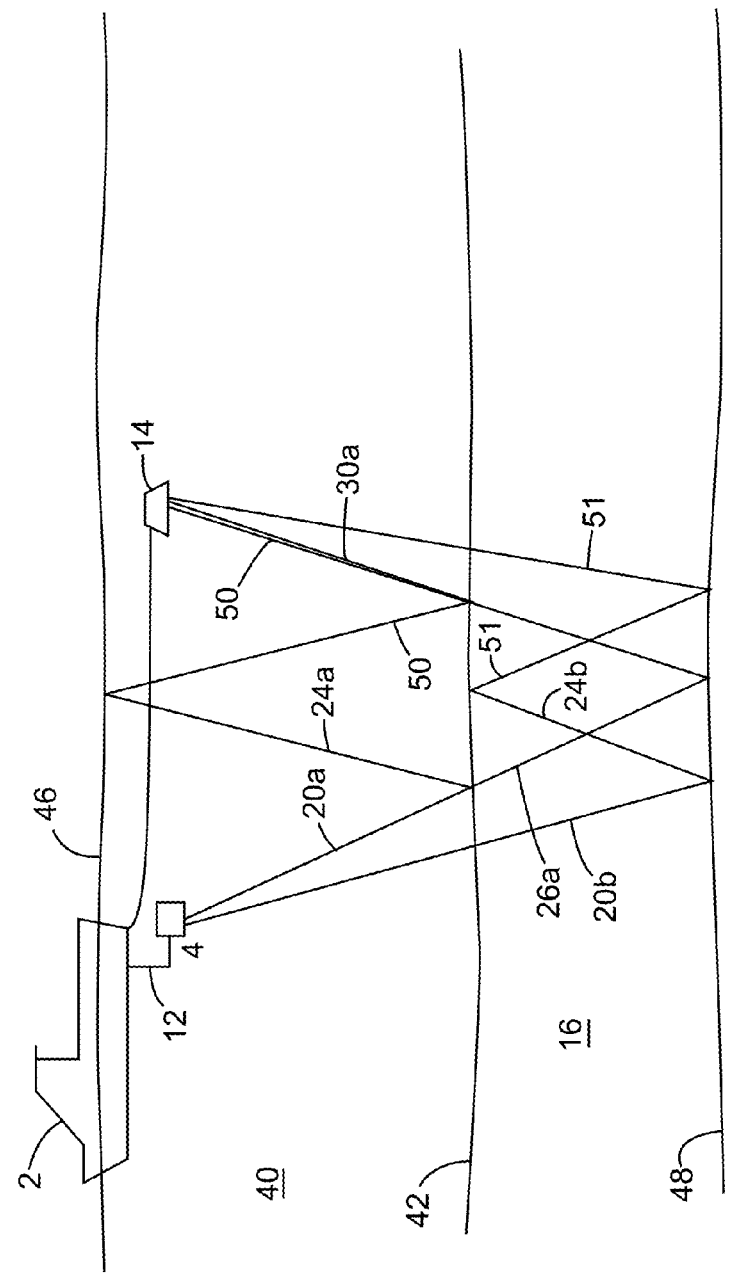

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The following embodiments are discussed, for simplicity, with regard to the terminology and structure of a marine based seismic exploration system, though the embodiments to be discussed next are not limited to these systems but may be applied to other types of seismic exploration systems, including, for example, land based seismic exploration systems.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: universal serial bus (USB); geographical area of interest (GAI); two dimensional (2D); three dimensional (3D); pre-stack depth migrations (PreSDM); residual move-out (RMO); pre-stack time migration (PreSTM); tilted transverse isotropy (TTI); low definition (LD); high definition (HD); low frequency (LF); high frequency (HF); conventional reflectivity image (CRI); high definition velocity reflectivity image (HDVRI); and common image gathers (CIG).

Figure 41:
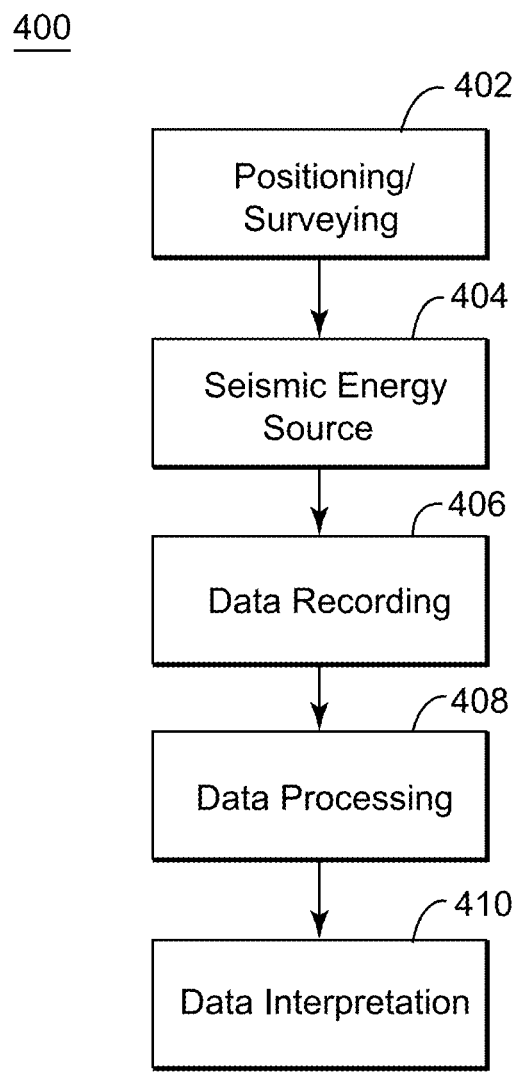
FIG. 41 illustrates a flow chart of a general method for seismic exploration according to an embodiment.

As generally discussed above, the main purpose of seismic exploration is to render the most accurate possible graphic representation of specific portions of the Earth's subsurface geologic structure (also referred to as a GAI). The images produced allow exploration companies to accurately and cost-effectively evaluate a promising target (prospect) for its oil and gas yielding potential (i.e., hydrocarbon deposits 44). FIG. 41 illustrates a general method for seismic exploration (method 400). There are five main steps: a detailed discussion of any one of the process steps would far exceed the scope of this document, but a general overview of the process should aid in understanding where the different aspects of the embodiments can be used. Step 402 of method 400 involves positioning and surveying of the potential site for seismic exploration. In step 404, a determination of what type of seismic energy source should be used, and then causing seismic signals to be transmitted. While method 400 applies equally to both marine and land seismic exploration systems, each will use different types of equipment, especially in generating seismic signals that are used to develop data about the Earth's subsurface geologic structure. In step 406, data recording occurs. In a first part of this step, receivers 14,64 receive and most often digitize the data, and in a second part of the step 406, the data is transferred to a recording station. In step 408, data processing occurs. Data processing generally involves enormous amounts of computer processing resources, including the storage of vast amounts of data, multiple processors or computers running in parallel. Finally, in step 410, data interpretation occurs and results can be displayed, sometimes in two-dimensional form, more often now in three dimensional form. Four dimensional data presentations (a 3D plot or graph, over time (the fourth dimension) are also possible, when needed to track the effects of other processes, for example.

Method for Determining a High Definition Tomography Velocity Model of a Geographical Area of Interest According to an Embodiment According to an embodiment, several applications of an innovative high resolution tomography system and method are presented that inverts densely picked dip and residual move-out data to reveal detailed structurally conformable velocities. Application of the method to synthetic 2D Marmousi II dataset demonstrates its ability to produce structurally conformable velocity models with a level of detail that promotes velocity attributes as an aid to geological interpretation. As such, it is complementary to full waveform inversion for the interpretation of reflected waves. An application to actual 3D marine dataset is shown wherein obtained higher resolution velocity model results in improved focusing of migrated images and an improved match to well velocities. As those of ordinary skill in the art can appreciate, wells provide a means for ascertaining actual velocity measurements as a means for comparison to theoretically developed velocity model data.

In recent developments, successive step changes in tomography-based migration velocity systems and methods have resulted in much improved seismic imaging over time. As for any inversion-based method, these step changes fall in two categories: a first one concerns the data to invert and a second family relates to the model-space representation and the inversion algorithms. As those of skill in the art can appreciate, inversion based systems, at their most basic level, determine input data based on expected output data and expected models.

For those methods that relate to improvements concerning ascertainment of the data, high density rich azimuth acquisition geometries have greatly increased the angular redundancy/diversity of wave-paths that constitutes the main velocity discriminator. Systems and methods for removing and/or isolating noise coupled with signal enhancement techniques have also significantly contributed to improve reliability of dense automated picking tools (see, Siliqi R., et al., 2009, "Structurally Coherent Wide Azimuth Residual Move Out Surfaces," 79th annual SEG meeting, SEG Expanded Abstracts, 4039-4043).

For those method that relate to improvements concerning model-space representation and the inversion algorithms, significantly larger linear systems and associated methods have been implemented wherein enormous amounts of data can be processed to provide enhanced velocity models.

Figure 4:
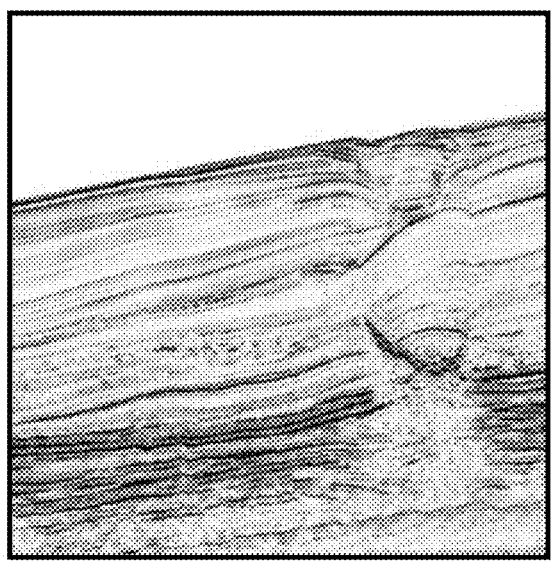
FIG. 4 illustrates a pre-stack data migration image of an underground structure of a geographic area of interest.
Figure 5:
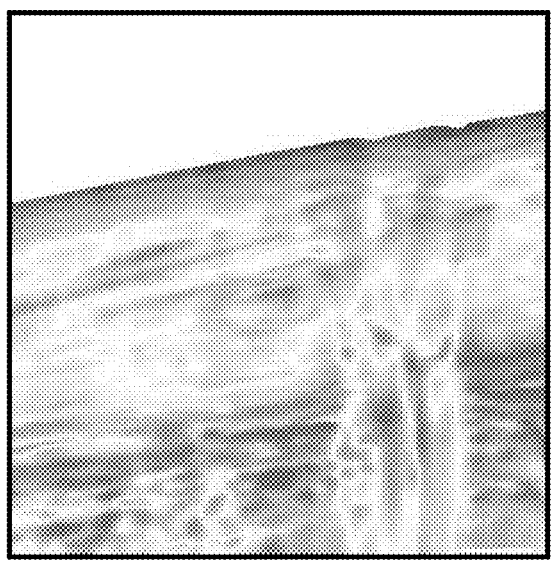
FIG. 5 illustrates an image of the same geographic area of interest as in FIG. 4, but using a densely picked residual move-out process that can be observed on common image-point gathers.

The initial forays into tomographic approaches involved iterative processes with several iterations of pre-stack depth migrations (PreSDM), residual move-out (RMO) picking, and linear updates of velocity (see, Liu, Z., 1997, An Analytical Approach to Migration Velocity Analysis," Geophysics 62, 1238-1249; and Woodward, M., et al., 1998, Automated 3D Tomographic Velocity Analysis of Residual Move-out in Pre-stack Depth Migrated Common Image Point Gathers," 68th Annual International Meeting, SEG, Expanded Abstracts, 1218-1221). Non-linear systems and methods have also been developed, include non-linear tomography (see, Guillaume, P., et al., 2001. "3D finite-offset Tomographic Inversion of CRP-Scan Data, With or Without Anisotropy," 71st annual SEG meeting, SEG Expanded Abstracts 20, 718-721), and more recently non-linear slope tomography (see, Billette F., et al., 2003, "Practical Aspects and Application of 2D Stereotomography," Geophysics, Vol. 68, No. 3, pages 1008-1021; Lambaré, G., 2008, "Stereotomography," Geophysics, 73, 5, VE25-VE34; and see, Guillaume, P., et al., 2008, "Kinematic Invariants: An Efficient and Flexible Approach for Velocity Model Building," 78th annual SEG meeting, SEG workshop "Advanced Velocity Model Building Techniques for Depth Imaging") that uses a local focusing criterion with no assumptions about the shape of the reflectors or of the RMO curves. Moreover, the physics of wave propagation is more accurately taken into account with tilted transverse isotropy (TTI) velocity models. Despite these advances, velocity models updated with such approaches remain smooth and poorly conform to structures. For example, in regard to FIG. 4, which illustrates a pre-stack data migration image of an underground structure of a geographic area of interest (GAI) and FIG. 5, which illustrates an image of the same geographic area of interest as in FIG. 4, but using a densely picked residual move-out (RMO) and dip process, there is FIG. 6 that illustrates a velocity model image of the same geographic area of interest as in FIGS. 4 and 5, but with much less velocity resolution and matching to the geologic structures than desired. This appears as a serious drawback considering velocity structures revealed by full waveform inversion (see, Plessix, et al., 2010, "Application of Acoustic Full Waveform Inversion to a Low-frequency Large-offset Land Data Set," 81st annual SEG meeting, SEG Exp. Abstracts 30, 930-934). FIG. 4 exhibits nice detailed features corresponding to geological structures, and in comparison between the illustration of FIGS. 5 and 6 (FIG. 6 being the velocity model of the same GAI), the rapid changes in RMO in the gently dipping thin beds and in the structured area do not translate into detailed velocities after conventional tomography.

Embodiments described herein provide an innovative high definition (HD) tomography system and method that can estimate detailed structurally-conformable velocity models. The capability of the system and method according to embodiments to reveal detailed spatial variations of velocity and to improve seismic imaging is first illustrated using Marmousi II synthetic dataset. In addition, use of the system and method for high definition tomography systems according to embodiments presented herein is used with an actual marine dataset to illustrate its improvements over conventional systems and methods.

FIG. 7 illustrates a flowchart of method 100 for determining a high definition (HD) tomography velocity model of a geographical area of interest (GAI) according to an embodiment. According to an embodiment, a HD velocity model means a velocity model that contains vertical frequencies higher than about 3 to about 6 Hz, thus filling in the usual gap found between reflectivity and velocity, as shown and described in reference to FIG. 19. High definition velocity models are obtained by HD tomography that starts with best model from conventional tomography. HD tomography looks for smaller velocity model Eigen values of a linear system to solve while introducing specific constraints derived from inversion data in order to avoid inversion instability. Method 100 begins with step 102, wherein a reasonably accurate velocity model is obtained by conventional means. Such conventional velocity model can include, for example, a multi-layer velocity model representation into which layer boundaries describing strong velocity contrasts can be introduced.

In step 104 the density of the data within each of the velocity models is determined. The density of each velocity model layer will be used in determining the size of a grid mesh, as discussed below. Following step 104, in step 106, method 100 determines the spatial wavelengths of the velocity variations within each of the velocity model layers. Then, in step 108, the size of the velocity grid mesh is determined according to the previously determined velocity model layer data density and spatial wavelengths of the velocity variations within each of the velocity model layers. Of course, each of steps 106-108 is performed for each velocity model layer (of which there could be dozens or even hundreds). According to an embodiment, the grid mesh, which essentially determines the nature of the high definition velocity model, is determined to provide a much higher definition of the different velocities that was previously obtained in the convention velocity model.

Figure 6:
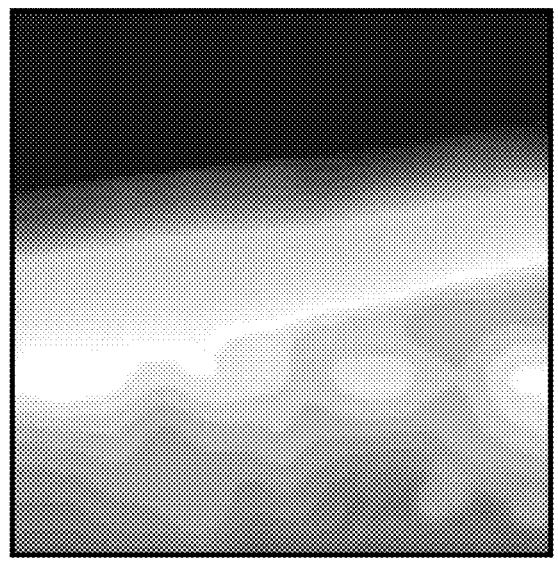
FIG. 6 illustrates a velocity model image of the same geographic area of interest as in FIGS. 4 and 5, showing less velocity resolution and matching to the geologic structures than desired.

In step 110, RMO and dip data are developed from the grid mesh data in a substantially continuous manner such that significant amounts of data are generated. In step 112, method 100 reviews the RMO and dip data for outliers and disregards the same. In step 114, the now densely picked RMO and dip data are inverted, to develop the HD velocity model. According to an embodiment, there are at least two methods for performing RMO picking In a first method, detailed RMO information can be obtained by tracking local coherency in multi-dimension along common image gathers (CIG) (see, Traonmilin, Y., et al., 2009, Multi-dip Estimation in 'N' Dimensions," EAGE 71st Conference, EAGE Extended abstract, P083) or scanning parametric curves along common image gathers (CIG) (Siliqi et al., 2009). The multi-dimensional tracking approach is more accurate when the signal to noise ratio is sufficiently high, while the curve/surface picking methods can be preferred when signal to noise ratio is low. Because tomography from surface seismic experiments tries to solve a quite ill-posed inversion problem in some kind of least squares sense, it is important to make it as well-conditioned as possible and to reject outliers in RMO picks as much as possible. As can be seen in FIG. 6, HD velocity model building tomography performed according to the embodiment discussed above accurately translates the validated small spatial variations of RMO into localized perturbations of velocity, i.e., much greater resolution in the differences of velocity in corresponding structures.

Application of the System and Method for Determining a High Definition Tomography Velocity Model of a Geographical Area of Interest According to an Embodiment Using Synthetic Field Data Attention is directed to FIGS. 8-9. FIG. 8 illustrates a non-linear slope tomography velocity model determined according to conventional methods using well-known Marmousi II synthetic data (Martin, G. S., et al., 2006, "Marmousi 2: An Elastic Upgrade for Marmousi," The Leading Edge 25, 156-166.), FIG. 9 illustrates a HD velocity model using well-known Marmousi II synthetic data determined in accordance with the method according to an embodiment described herein, and FIG. 10 illustrates an actual velocity model based on the well-known Marmousi II synthetic data. The water column has a height (or depth) of about 460 m. The Marmousi II model is interesting because it exhibits velocity discontinuities that can be expected to be recovered with the HD tomography velocity model according to an embodiment. Synthetic seismic data developed in the Marmousi II model is computed by an acoustic wave equation using a finite differences scheme for a marine type acquisition with a maximum offset of 3 km.

FIG. 8 illustrates the velocity model using a conventional method (non-linear slope tomography), and this produces a relatively smooth velocity model. In FIG. 9, a full data PreSDM is run beginning with the velocity model shown in FIG. 8, i.e., using the method according to an embodiment discussed herein. As detailed above in method 100 shown in FIG. 7, RMO is picked again on high density CIGs and is inverted using high definition tomography. The obtained high definition model shown in FIG. 9 can readily be compared to a slightly smoothed version of the exact model shown in FIG. 10; not that improvement over the conventional method shown in FIG. 9, and the closeness between the results using the method according to an embodiment (FIG. 9) and the actual velocity model shown in FIG. 10. The results between FIGS. 9 and 10 are much more alike, and the improvement over the conventional method of FIG. 8 is substantial in FIG. 9.

As is evident from FIGS. 8-10, even if the velocity model obtained by a conventional tomography approach provides good focusing, it is quite smooth and poorly conforms to the geological structures. The HD tomography velocity model obtained according to an embodiment slightly improves the focusing and the positioning, but greatly improves the structural conformity of the velocity model which now nicely fits to the PreSDM image. Both in shallow and deeper parts of the velocity model thin velocity layers now appear and nicely match those of the exact model (i.e., FIGS. 9 and 10 are substantially similar).

Figure 11:
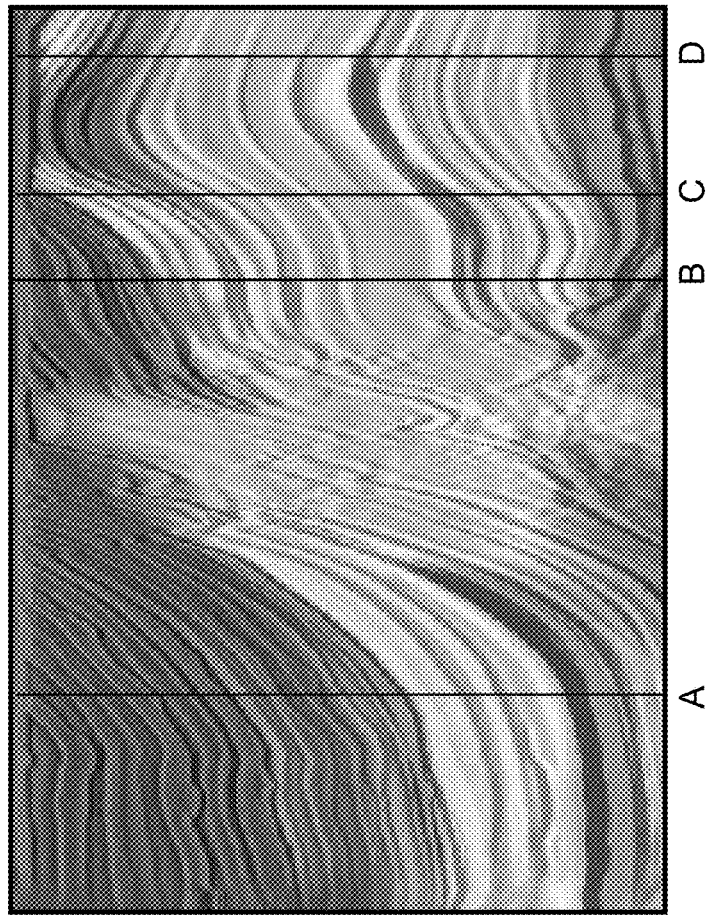
FIG. 11 illustrates a superimposition of the actual seismic data and HD tomography velocity model data developed according to an embodiment from FIGS. 8-10 in one diagram.

FIG. 11 illustrates a superimposition of the actual seismic data and HD tomography velocity model data developed according to an embodiment from FIGS. 8-10 in one diagram, and FIGS. 12A-D illustrate comparisons of the velocity model data profile at four locations in the superimposed diagram of FIG. 11. Four logs—or "slices" of data—are extracted from FIG. 11 and shown with greater resolution in FIGS. 12A-D (log/slice A=FIG. 12A, log/slice B=FIG. 12B, and so on), so that a comparison between the conventional tomography, high definition tomography and exact velocity models can be shown explicitly. According to an embodiment, improvements in terms of resolved spatial frequency of vertical variations of velocity of between 6-8 Hz has been realized, whereas conventional processes provide only about 2 Hz of the same. In FIGS. 12A-D, the exact vertical velocity profile are shown as lines 1206 and are smoothed in order to fit with the resolution of the high definition tomographic result, the conventional tomography is shown as lines 1202, and the HD tomography velocity model is shown as line 1204. As can be appreciated by those of skill in the art, the variations in velocity as illustrated by the HD tomography velocity model according to an embodiment are very well detected and quantified, especially in the shallow parts.

Figure 13:
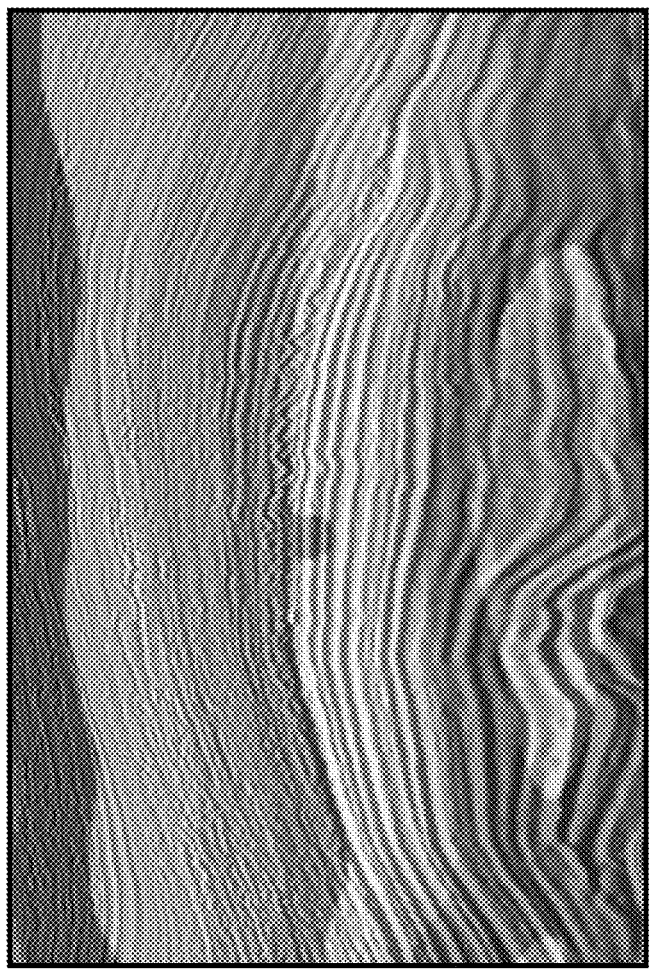
FIG. 13 illustrates a conventionally obtained velocity model superimposed on an initial PreSDM image using actual data from a known geographical area of interest.
Figure 14:
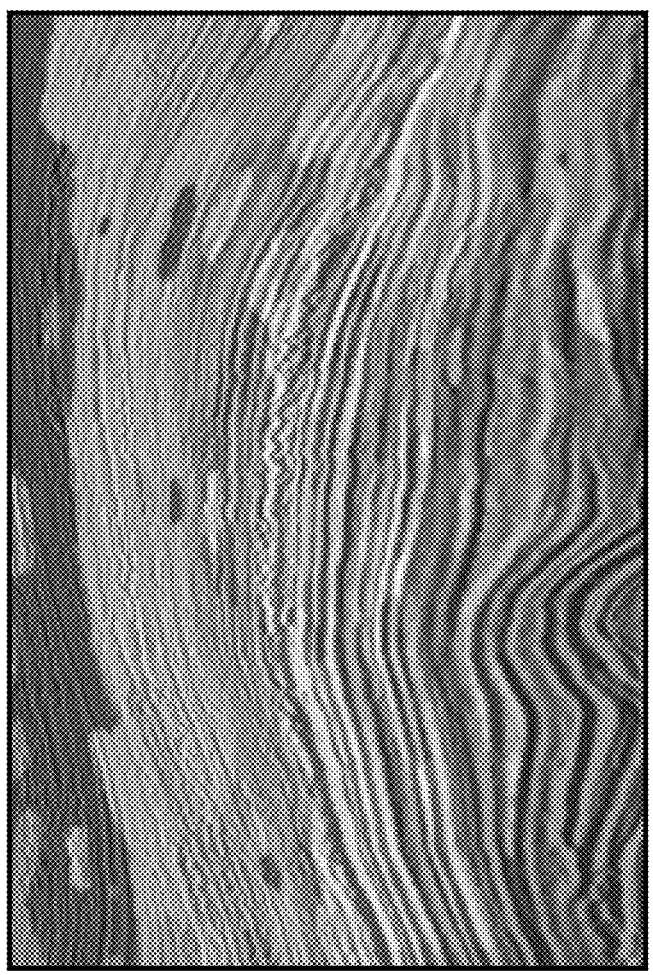
FIG. 14 illustrates a HD velocity tomography model obtained using the method according to an embodiment discussed herein superimposed on an a final PreSDM image using actual data from the same geographical area of interest as shown in FIG. 13.

Application of the System and Method for Determining a High Definition Tomography Velocity Model of a Geographical Area of Interest According to an Embodiment Using Actual Field Data FIG. 13 illustrates a conventionally obtained velocity model superimposed on an initial PreSDM image using actual data from a known GAI, and FIG. 14 illustrates a HD velocity tomography model obtained using the method according to an embodiment discussed herein superimposed on an a final PreSDM image using actual data from the same GAI as shown in FIG. 13. FIG. 13 illustrates a conventional velocity model building as discussed by Guillaume, P., et al., 2008, "Kinematic Invariants: An Efficient and Flexible Approach for Velocity Model Building," 78th annual SEG meeting, SEG workshop "Advanced Velocity Model Building Techniques for Depth Imaging." The use of Guillaume's method provided for imaging of complex structures and used TTI to fit the image and velocity model to the wells thanks to the introduction. As understood by those of skill in the art, the "image" is the cross-sectional view of the GAI and its geological features (i.e., layers, or strata), that can be most advantageously obtained using a velocity model and further data processing. Thus, FIG. 13 is both a view of a conventional "Guillaume" velocity model, and the determined image of the same GAI.

As discussed above, both FIGS. 13 and 14 illustrate their respective velocity models being superimposed with the corresponding depth migrated images. As can be understood and seen by one of skill in the art, the high definition velocity model (FIG. 14) nicely conforms to the geological structures but also nicely improves the structures in the PreSDM image (see the bottom flat reflector in FIG. 14).

Referring now to FIGS. 15 and 16, FIG. 15 illustrates a common image gather of a different marine geographical area of interest, FIG. 16A illustrates a close up view of the CIG in the box of FIG. 15 prior to implementation of the method according to an embodiment, and FIG. 16B illustrates a close up view of the CIG in the box of FIG. 15 following implementation of the method according to an embodiment. In comparing FIG. 16B to FIG. 16A, it can be seen that flattening of the CIGs has been significantly improved as expected when performing HD velocity tomography according to an embodiment.

Figure 17:
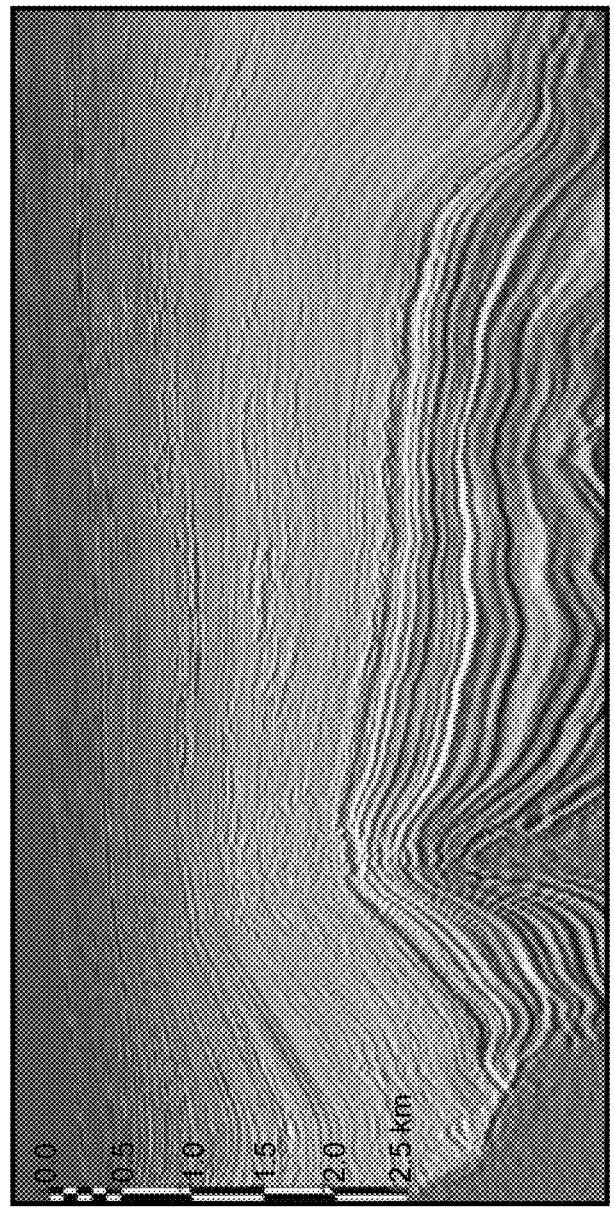
FIG. 17 illustrates a larger view of the marine data shown in FIG. 15 with a HD velocity tomography model determined according to an embodiment superimposed on the marine data shown in FIG. 15 (represented as a final PreSDM stack)
Figure 18:
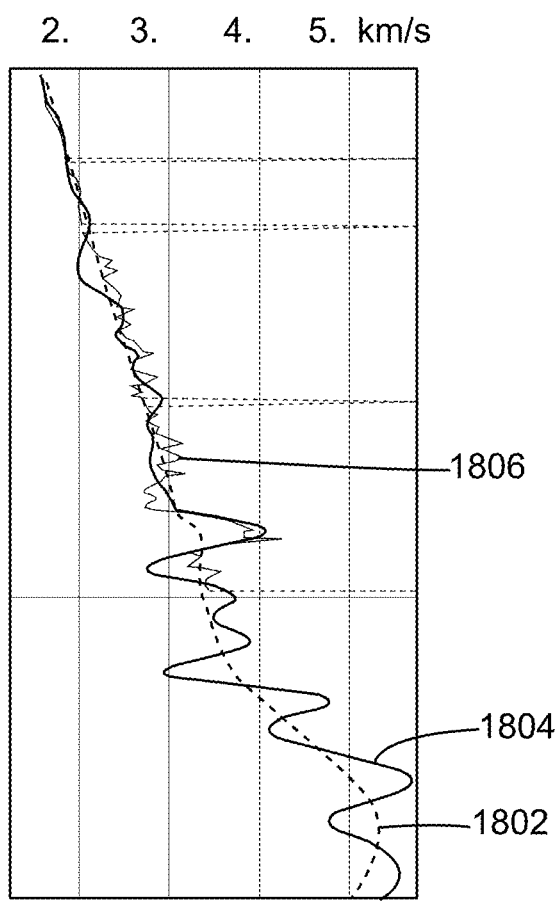
FIG. 18 illustrates a comparison of preconditioned well log velocity at a well location, a conventionally obtained velocity model data at the well location, and HD velocity model data determined according to an embodiment also at the well location, the well location being located in the marine GAI shown in FIG. 17.

FIG. 17 illustrates a larger view of the marine data shown in FIG. 15 with a HD velocity tomography model determined according to an embodiment superimposed on the marine data (represented as a final PreSDM stack), and FIG. 18 illustrates a comparison of preconditioned well log velocity at a well location, a conventionally obtained velocity model data at the well location, and HD velocity model data determined according to an embodiment also at the well location, the well location being located in the marine GAI shown in FIG. 17.

FIG. 17 illustrates the HD velocity model data determined according to an embodiment discussed herein superimposed with the final PreSDM stack image data. As can be appreciated by those of skill in the art, the results illustrated in FIG. 17 are very representative of what can be expected from HD tomography velocity model developed according to an embodiment as an aid to interpretation. FIG. 17 shows a clear and nice delineation of the velocity structures along the layers. The velocity definition appears suitable for pore pressure prediction and interpretation of fast velocity layers (carbonates). Compared to conventional pore pressure prediction done in time domain, the HD tomography velocity model is part of a physically valid pure depth workflow, which improves the accuracy of estimated velocities and the focusing of final PreSDM images. FIG. 18 illustrates a comparison of preconditioned well log velocity at a well location (line 1806), a conventionally obtained velocity model data at the well location (line 1802), and HD tomography velocity model data determined according to an embodiment also at the well location (line 1804), the well location being located in the marine GAI shown in FIG. 17.

Described and shown herein are two applications of an innovative HD tomography velocity model according to an embodiment that inverts densely picked RMO data for revealing detailed structurally conformable velocities. The application of the HD tomography velocity model according to an embodiment to the synthetic 2D Marmousi II dataset demonstrates the ability to produce structurally conformable velocity models with a level of detail that promotes velocity attributes as an aid to geological interpretation. As such the HD tomography velocity model according to an embodiment can offer an alternative to full waveform inversion for the interpretation of reflected waves. The application of the HD tomography velocity model according to an embodiment to a 3D marine dataset further demonstrates the capability of the method in presence of noise. The data obtained from the HD tomography velocity model according to an embodiment results in improved focusing as well as an improved match to the well velocities.

Figure 19:
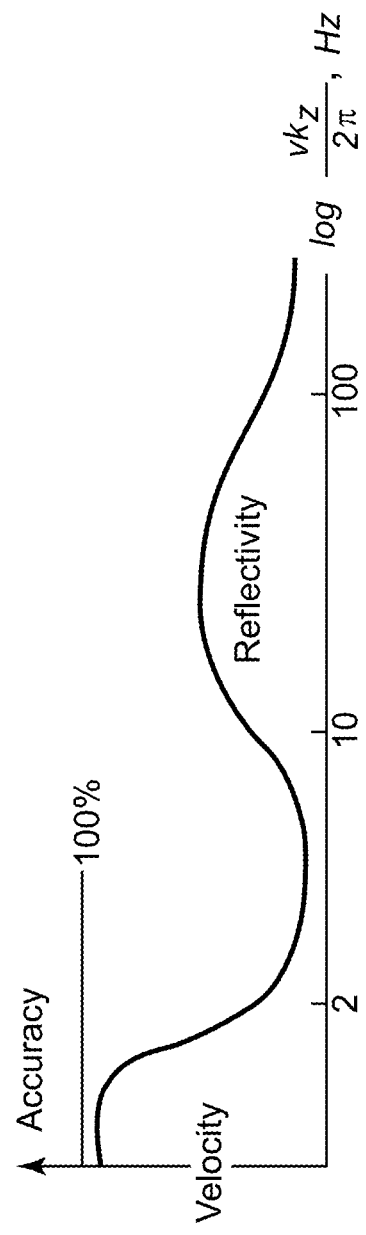
FIG. 19 illustrates reliability of information obtained from surface seismic measurements using conventional processes.

Method for Developing a Broadband High Definition Reflectivity Based Image for a GAI Using a HD Tomography Velocity Model and a Conventional Reflectivity Based Image for the GAI as a Basis According to a Further Embodiment As those of skill in the art can appreciate, the system and method discussed above provide for improved velocity models that can be the starting basis for improved seismic reflectivity images of a GAI. However, while the improved velocity models could be used therewith conventional seismic reflectivity image creating processes, according to a further embodiment, further discussed herein are improved systems and methods that use the high definition velocity models described herein, or other high definition velocity models as its basis for determining broadband high definition pre-stack time migration or pre-stack data migration reflectivity images of a geographical area of interest according to an embodiment. As those of skill in the art can appreciate, the term "broadband" is a relative term; the initial signal can be broadband and it becomes even more broadband when combined with low frequency (LF) velocity information As those of skill in the art can appreciate, the aim of inverting seismic waveforms is to obtain the "best" earth model, which can roughly be defined as the one producing seismograms that best match (usually under a least-squares criterion) those recorded. Previously published articles have discussed these ideas in great detail, and one preeminent scholar posited an idea, later verified, that earth structure's wavelengths could be resolved from seismic reflection data (see, J. Claerbout, "Imaging the Earth's Interior," 1985, p47, Fig.1.4-3, *Reliability of information obtained from surface seismic measurements*). This concept was described and summarized in a simple, but meaningful graph, shown in FIG. 19. FIG. 19 illustrates reliability of information obtained from surface seismic measurements using conventional processes. As discussed in Mr. Claerbout's book,

[n]ote that there is an information gap from 2-10 Hz. Even presuming that rock physics can supply us with a relationship between P and K, the gap seriously interferes with the ability of a seismologist to predict a well log before the well is drilled. What seismologists can do somewhat reliably is predict a filtered log.

The observational situation described above has led reflection seismologists to a specialized use of the word velocity. To a reflection seismologist, velocity means the low spatial frequency part of "real velocity." The high-frequency part of the "real velocity" isn't called velocity: it is called reflectivity. Density is generally disregarded as being almost unmeasurable by surface reflection seismology.

(http://sepwww.stanford.edu/sep/prof/iei/xrf/paper_html/node19.html#SECTION00122300000000000000)

Thus, debate on wavelengths of earth structures resolved by reflection seismics continues to evolve. While long wave length components of the velocity model can be solve by tomography, short wave length components are solved from the reflectivity. As seen in FIG. 19, the graph created by J. Claerbout in 1985, between these two domains the mid wavelength could hardly be obtained, i.e. there exists a mid-wavelengths' gap.

Figure 20:
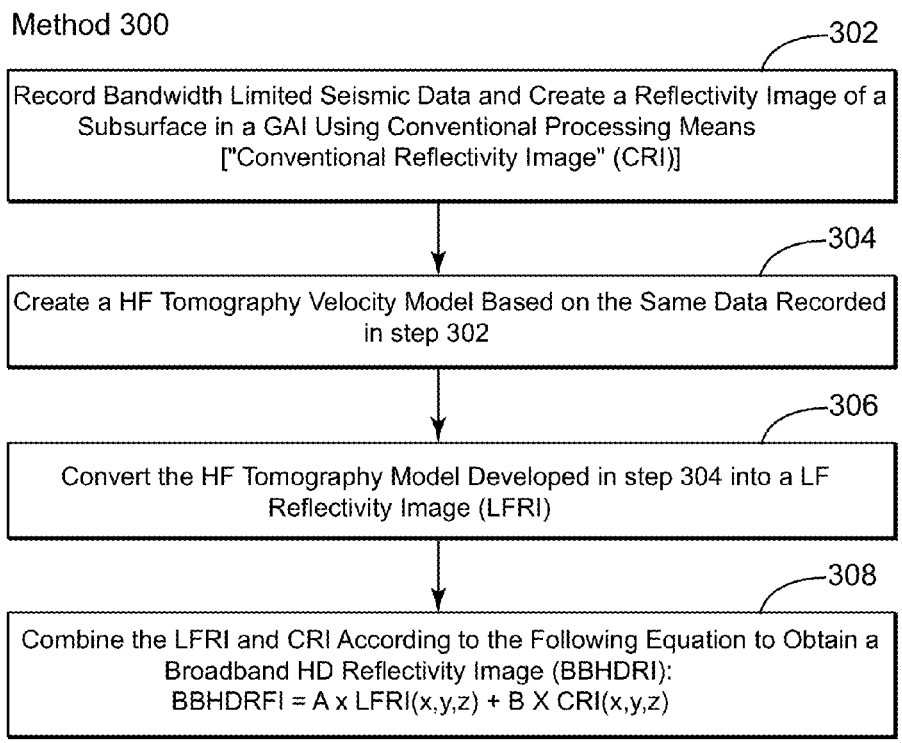
FIG. 20 illustrates a method for determining broadband high definition pre-stack time migration or pre-stack data migration reflectivity images of a geographical area of interest according to an embodiment.

FIG. 20 illustrates a method 300 for developing a broadband high definition reflectivity based image for a GAI using a HD tomography velocity model and a conventional reflectivity based image for the GAI as a basis according to a further embodiment.

Method 300 begins with step 302 wherein bandwidth limited seismic data is recorded and used to create a reflectivity image of a subsurface in a GAI using conventional processing means. This reflectivity image can be referred to as a "conventional reflectivity image" (CRI). In step 304, a HD or high frequency (HF) tomography velocity model is generated using the same data, according to, for example, method 100 as discussed above in regard to FIG. 7. However, as those of ordinary skill in the art can appreciate, method 300 for constructing the broadband HD reflectivity image of the GAI according to an embodiment is not limited to use of method 100 that develops a HF tomography velocity model as described in great detail above; other methods, both known and unknown, can be used in method 300 according to an embodiment.

Method 300 then proceeds to step 306 wherein the HF tomography velocity model developed in step 304 is then converted into an image of the reflectivity of the subsurface of the GAI, or "low frequency (LF) Reflectivity Image" (LFRI). According to an embodiment, the LF reflectivity image can be at least one of either a PreStack Time Migration image, and a PreStack Depth Migration image. In step 308, the LFRI and CRI are adaptively merged according to the following equation to obtain a broadband HD reflectivity image (BBHDRI):

$$BBHDRFI = A \times LFRI(x,y,z) + B \times CRI(x,y,z) \qquad (1),$$

wherein A and B are operators, developed empirically in order to adapt time and frequency dependent phases and amplitudes to both LFRI and CRI signals. As those of the art can appreciate, although the figures associated with the embodiments discussed herein are all shown in two dimensions, the embodiments can also be realized in three dimensions, as Equation (1) indicates. According to an embodiment, the reflectivity estimates or images from the HD velocity models are very low frequency estimates. These are then added to the reflectivity images developed from the previously obtained seismic data, which are relatively "high frequency" in comparison: the result, in effect, is to complement the image that normally would have been obtained by making use of the HD velocity model to estimate low-frequency reflectivity. The broadband HD reflectivity image can then be displayed to portray with substantially greater clarity and resolution the subsurface structure of the GAI.

Figure 23:
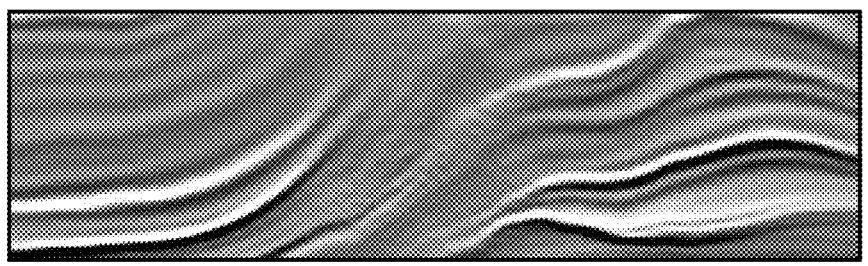
FIG. 23 illustrates a LF reflectivity image developed using conventional processes but using the HD velocity model data of FIG. 22 determined in accordance with step 306 of the second method according to an embodiment.
Figure 24:
FIG. 24 illustrates a conventional PreSDM HF reflectivity image developed using conventional processes using the well-known Marmousi II synthetic data in accordance with step 302 of the second method according to an embodiment.

According to an embodiment, the adaptive merge between the HD reflectivity image and the conventional reflectivity image comprises combining two signals with disparate signal spectra according to known combination techniques. According to a further embodiment, a spectral balancing approach is used. As shown in FIG. 26, line A and line B, which represent HD reflectivity image and the conventional reflectivity image spectra, respectively, a summation is tuned in the frequency range where the two signals overlap; the result is that the geological content is enhanced that facilitates interpretation of the image. According to a further embodiment, the tuned summation can include spectral shaping as needed of each components to facilitate summation of the two signals, and warping, or geometrical shaping of the images (as shown in FIGS. 23 and 24) to the extent necessary to obtain a best superimposition of the images (shown in FIG. 25). Thus, the adaptive merge includes both signal processing of two signals and data processing of the two images that provide the signals shown in FIG. 26. According to a further embodiment, adaptively merging the HD reflectivity image and the conventional reflectivity image comprises combining the two reflectivity images not only in overlapping frequency portions, but also in non-overlapping frequency portions.

According to an embodiment, "warping," or "geometrical shaping" techniques aim at compensating small time or space variant differences between the images to combine. Spectral shaping techniques aim at combining signals having different phase and amplitude spectra according to some assumptions on the regularity of the properties of the combined signal according to a further embodiment. According to a further embodiment, geometrical shaping includes image shaping the LF reflectivity image and the conventional reflectivity image using at least one of warping, shaping, and morphing, all of which are image shaping techniques known to those of skill in the art.

Figure 21:
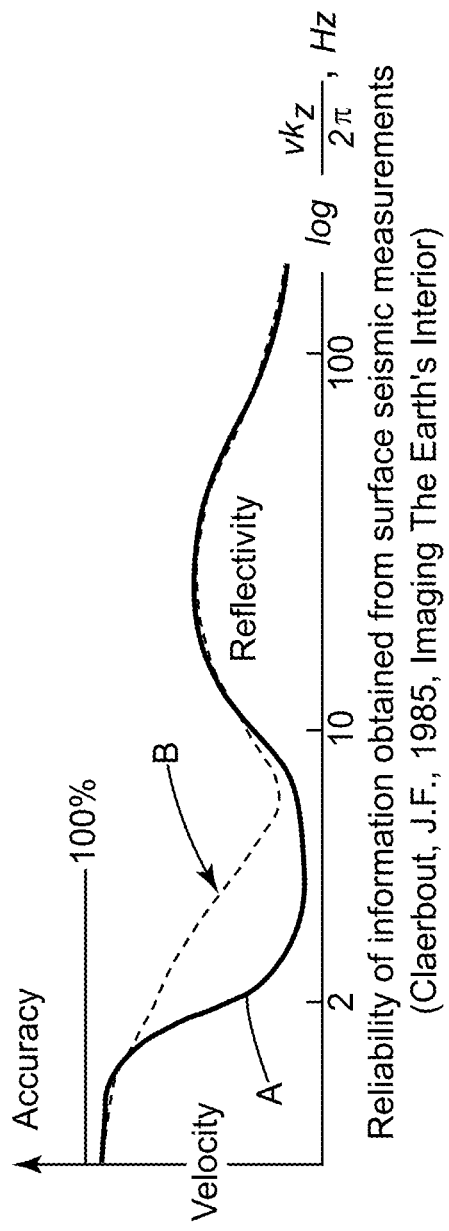
FIG. 21 illustrates reliability of information obtained from surface seismic measurements using the method for determining broadband high definition pre-stack time migration or pre-stack data migration reflectivity images of a geographical area of interest according to an embodiment.

As a result of the method described in regard to FIG. 20, a new graph can be created that indicates an improvement in imaging obtained by reflection seismology. FIG. 21 illustrates reliability of information obtained from surface seismic measurements using the method for determining broadband high definition pre-stack time migration or pre-stack data migration reflectivity images of a geographical area of interest according to an embodiment. In FIG. 21, line A represents the original reliability of information as described and provided by conventional processes and systems, according to Mr. Claerbout. Line B, however, indicates the substantial increase in reliability or accuracy of the information obtained from surface seismic measurements according to the embodiments described herein. The difference between FIG. 19, the original reliability model, and FIG. 21, the reliability model derived according the methods discussed herein according to an embodiment, result from an appreciation and subsequently derived mathematical processes as discussed in regard to method 300, discussed above in regard to FIG. 20. The appreciation and subsequently developed method illustrate that an overlap exists between low frequency (LF) broadband reflectivity (i.e., seismic data) and the HF velocities. The overlap and consequent mathematical combination, described herein as an adaptive merge, make it possible to adjust the gains or amplitudes in order to combine both partial images (see, e.g., FIGS. 26 and 35).

Figure 22:
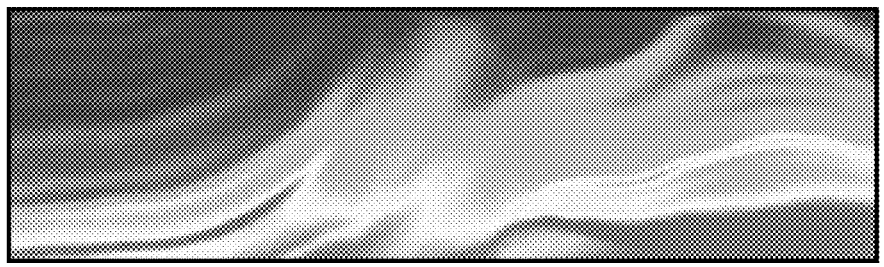
FIG. 22 illustrates a HD velocity model using well-known Marmousi II synthetic data determined in accordance with a first method and step 304 of the second method illustrated in flowchart form in FIG. 20 according to an embodiment.
Figure 25:
FIG. 25 illustrates an adaptive merge of the conventional PreSDM HF reflectivity image developed in accordance with step 302 of the second method and the LF reflectivity image developed in accordance with step 306 of the second method as performed in step 308 of the second method according to an embodiment.
Figure 26:
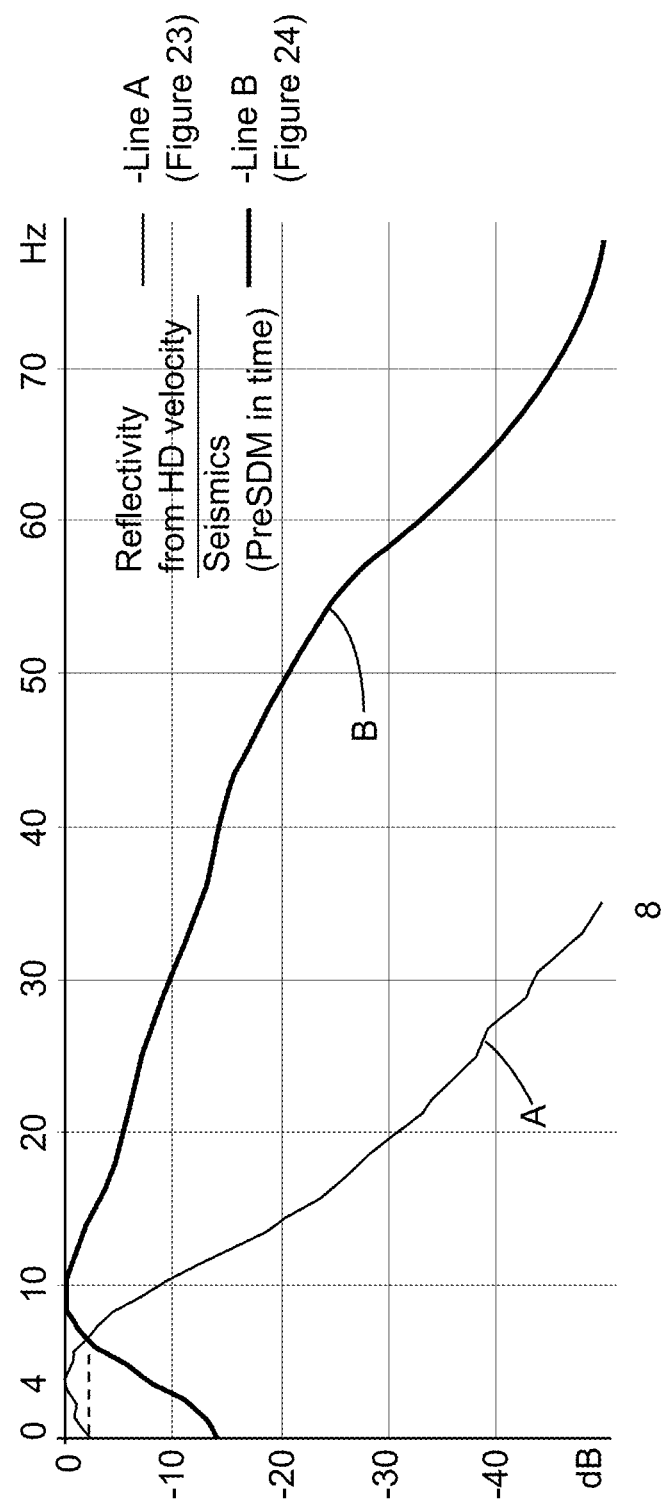
FIG. 26 illustrates an effective spectra image derived from seismic reflectivity and velocity data, in regards to the image shown in FIG. 23 (LF reflectivity derived from HD velocity) and the PreSDM HF reflectivity image shown in FIG. 24 according to an embodiment.

Application of the System and Method for Developing a Broadband High Definition Reflectivity Based Image for a GAI Using a HD Tomography Velocity Model and a Conventional Reflectivity Based Image for the GAI as a Basis According to a Further Embodiment Using Synthetic Field Data FIGS. 22 through 26 illustrate the processes and improvements of method 300 described above in regard to FIG. 19 when used on synthetic field data referred to as the Marmousi II model. In method 300, data is first recovered from receivers 14 as a result of signals or seismic waves transmitted by sources 4; however, such is not the case when using the synthetic data. FIG. 24 illustrates a conventional PreSDM reflectivity image developed using conventional processes using the well-known Marmousi II synthetic data in accordance with step 302 of second method 300 according to an embodiment. FIG. 22 illustrates a HD velocity model using well-known Marmousi II synthetic data determined in accordance with first method 100 and step 304 of second method 300 illustrated in flowchart form in FIG. 20 according to an embodiment. In FIG. 22, method 300 has performed step 304 such that a HD velocity model using well-known Marmousi II synthetic data has been created. FIG. 23 illustrates a LF reflectivity image developed using conventional processes using the HD velocity model data of FIG. 22 determined in accordance with step 306 of second method 300 according to an embodiment. FIG. 25 illustrates an adaptive merge of the conventional PreSDM reflectivity image developed in accordance with step 302 of second method 300 and the HD reflectivity image developed in accordance with step 306 of second method 300 as performed in step 308 of second method 300 according to an embodiment.

FIG. 26 illustrates an effective spectra image derived from seismic reflectivity and velocity data, in regards to the image shown in FIG. 23 (reflectivity derived from HD velocity) and the PreSDM reflectivity image shown in FIG. 24 according to an embodiment. The graph shown in FIG. 26 shows the effective spectra derived from seismic (reflectivity) and velocity data, and, according to an embodiment, that both spectra are overlapping. As a result, in the overlapping/common part of reflectivity and velocity distribution, these attributes can be combined, compared and processed to derive physical properties, as has been shown and described herein according to the embodiments. The graph from Claerbout 1985 (FIG. 19) shows the historical problem; the fact that the velocity and reflectivity distributions were not overlapping prevented conventional processes from mixing these quantities. The embodiments disclosed herein, especially as discussed in view of the methods 100 and 200 discussed in reference to FIGS. 7, and 20, respectively, has overcome those issues and the result is the generation of a high definition broadband reflectivity image that provides enhanced velocity models for GAIs.

Figure 27:
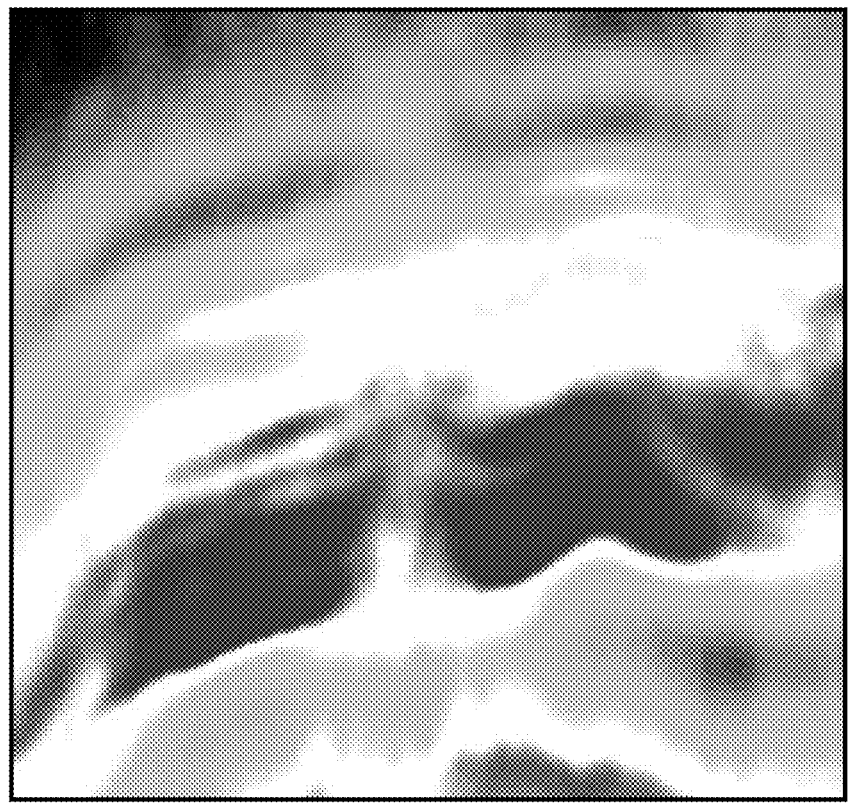
FIG. 27 illustrates a HD velocity model using a first example of actual field data determined in accordance with a first method and step 304 of the second method illustrated in flowchart form in FIG. 20 according to an embodiment.
Figure 28:
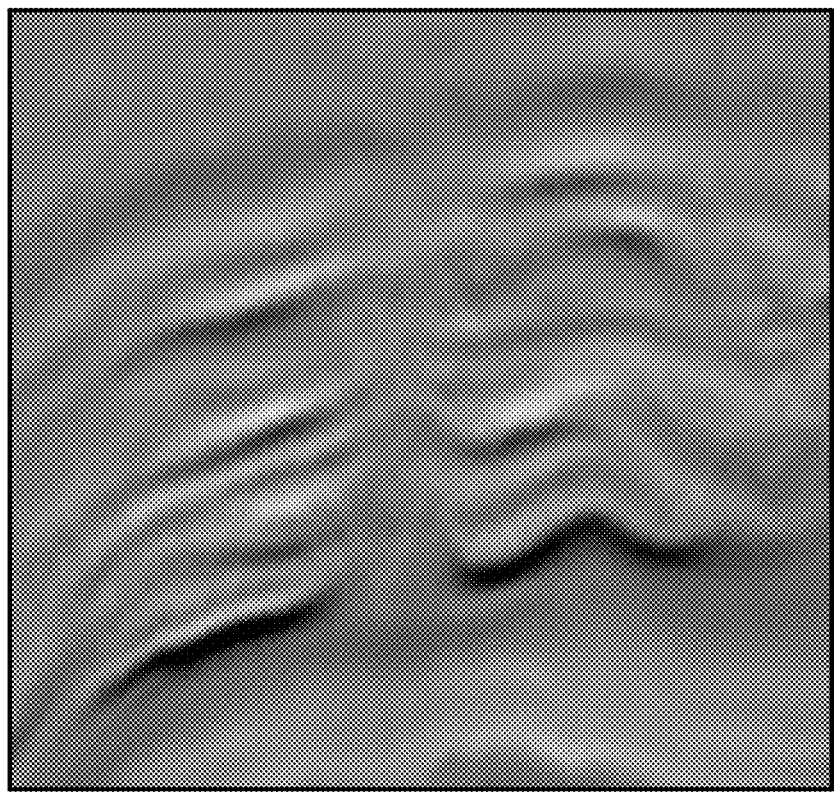
FIG. 28 illustrates a LF reflectivity image developed using conventional processes using the HD velocity model data of FIG. 27 determined in accordance with step 306 of the second method according to an embodiment.
Figure 29:
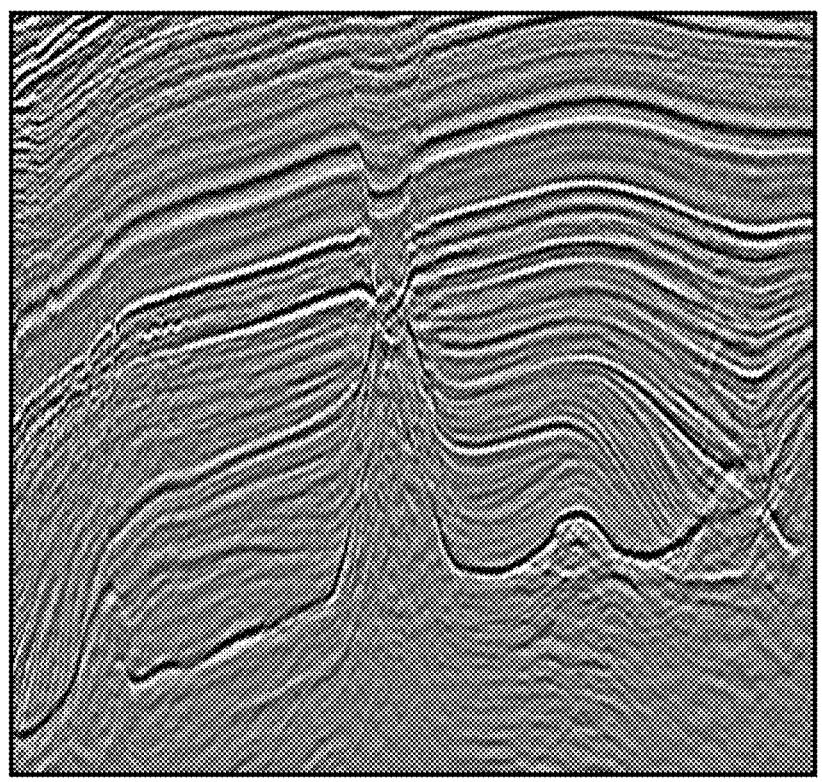
FIG. 29 illustrates a conventional PreSDM reflectivity image developed using conventional processes using the first example of actual field data in accordance with step 302 of the second method according to an embodiment.
Figure 30:
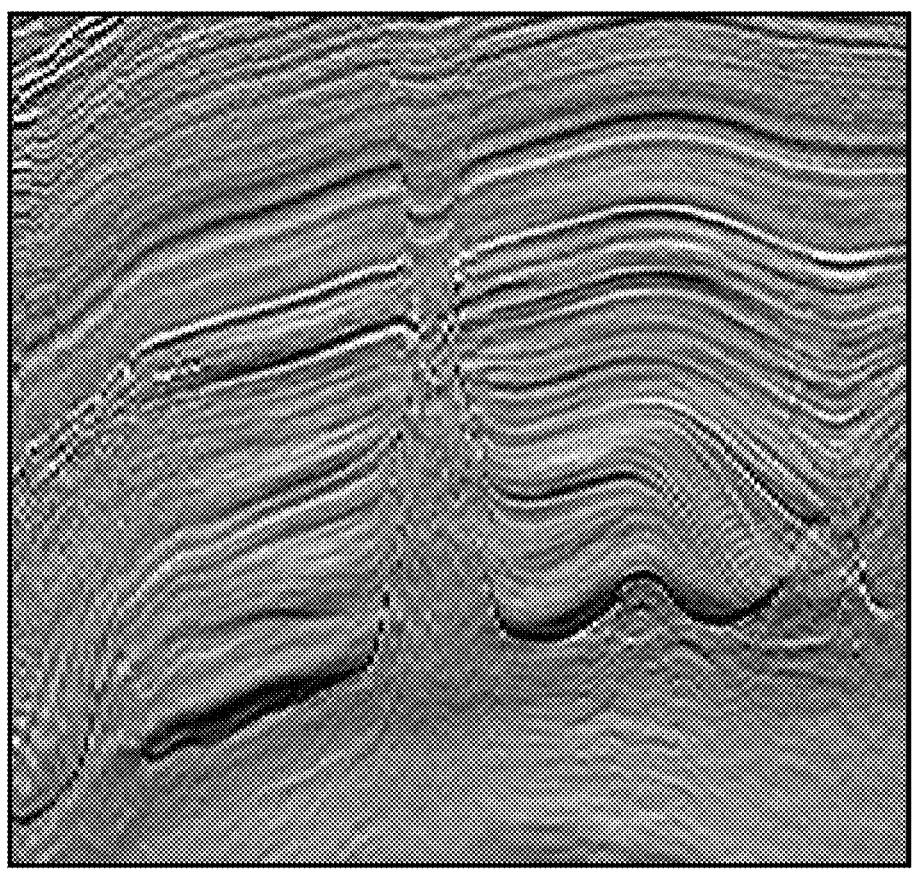
FIG. 30 illustrates an adaptive merge of the conventional PreSDM reflectivity image developed in accordance with step 302 of the second method and the LF reflectivity image developed in accordance with step 306 of the second method as performed in step 308 of the second method according to an embodiment.

Application of the System and Method for Developing a Broadband High Definition Reflectivity Based Image for a GAI Using a HD Tomography Velocity Model and a Conventional Reflectivity Based Image for the GAI as a Basis According to a Further Embodiment Using Actual Field Data FIGS. 27 through 30 illustrate the processes and improvements of method 300 described above in regard to FIG. 19 when used on a first example of actual field data. FIG. 29 illustrates a conventional PreSDM reflectivity image developed using conventional processes using the first example of actual field data in accordance with step 302 of second method 300 according to an embodiment. FIG. 27 illustrates a HD velocity model using the first example of actual field data determined in accordance with first method 100 and step 304 of second method 300 illustrated in flowchart form in FIG. 20 according to an embodiment. FIG. 28 illustrates a LF reflectivity image developed using conventional processes using the HD velocity model data of FIG. 27 determined in accordance with step 306 of second method 300 according to an embodiment. FIG. 30 illustrates an adaptive merge of the conventional PreSDM reflectivity image developed in accordance with step 302 of second method 300 and the LF reflectivity image developed in accordance with step 306 of second method 300 as performed in step 308 of second method 300 according to an embodiment.

Figure 31:
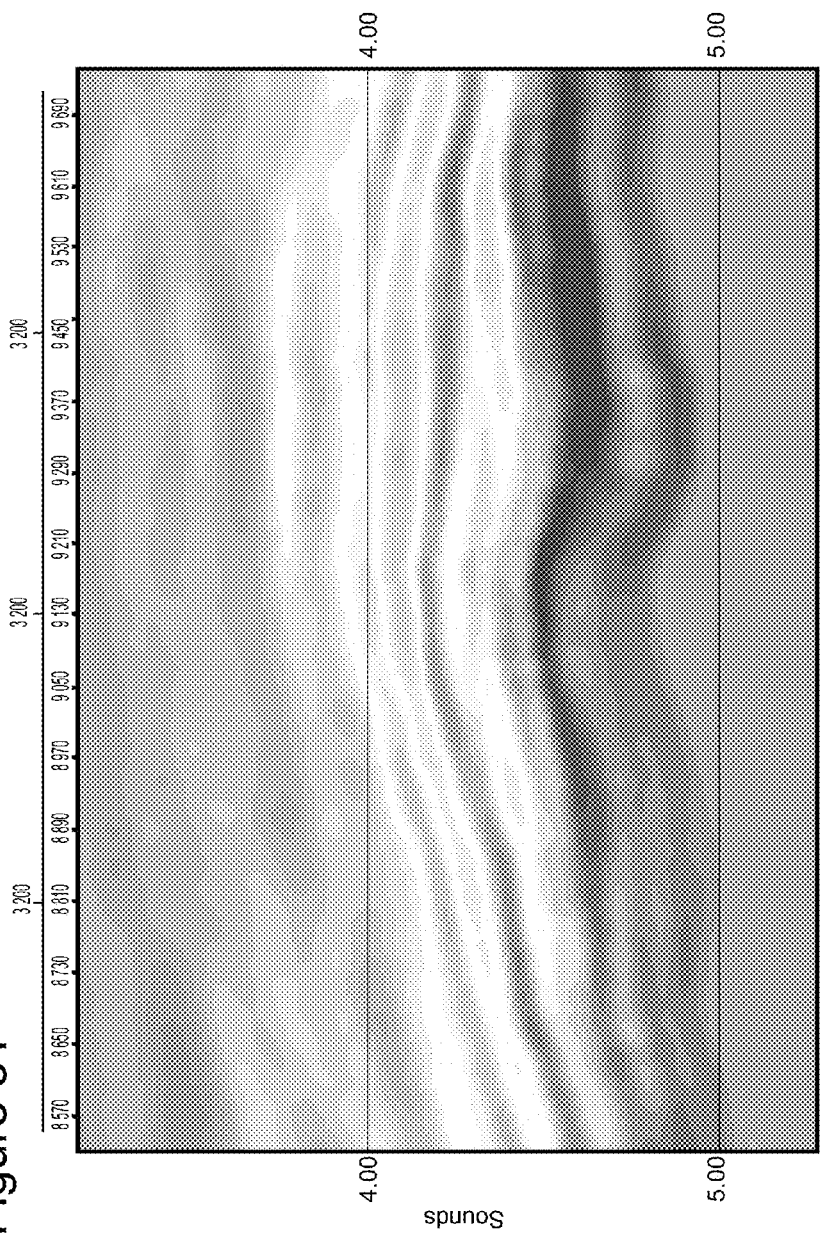
FIG. 31 illustrates a HD velocity model using a second example of actual field data determined in accordance with the first method and step 304 of the second method illustrated in flowchart form in FIG. 20 according to an embodiment.
Figure 32:
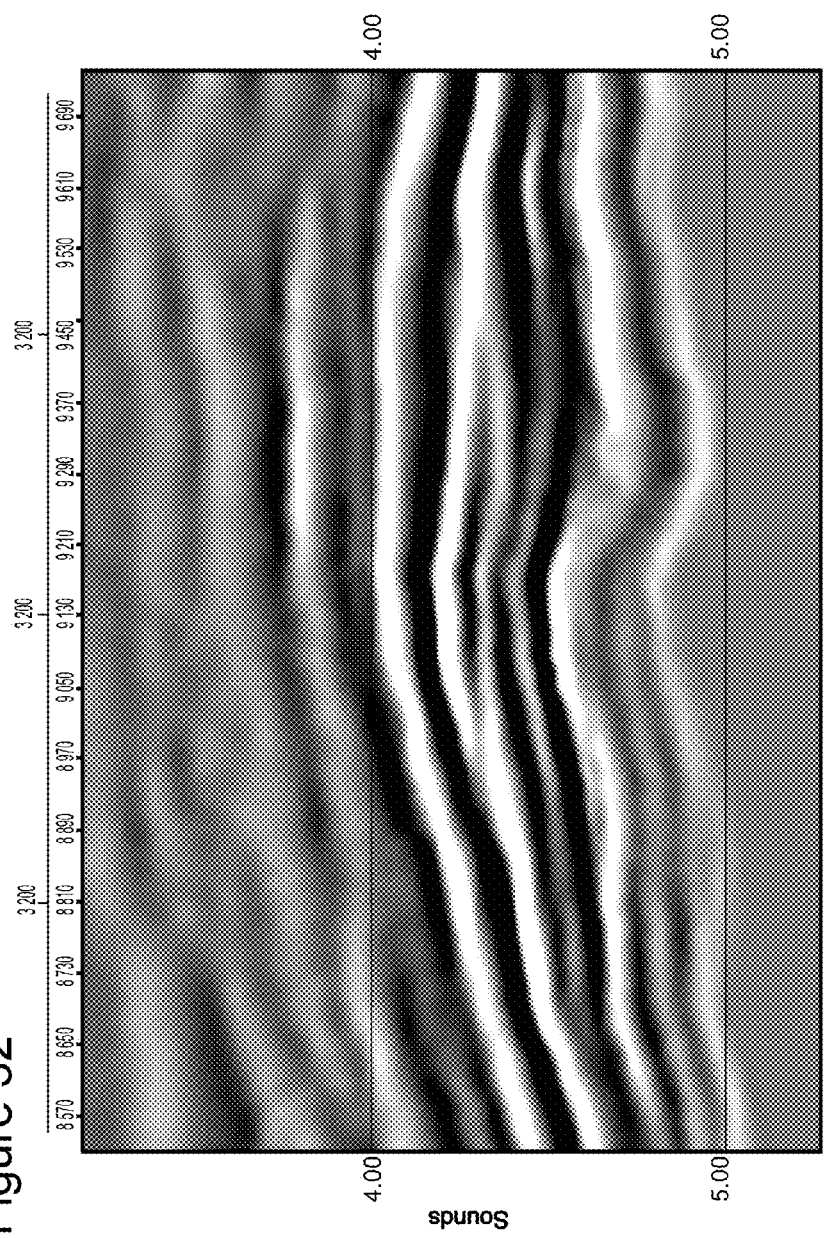
FIG. 32 illustrates a LF reflectivity image developed using conventional processes using the HD velocity model data of FIG. 31 determined in accordance with step 306 of the second method according to an embodiment.
Figure 33:
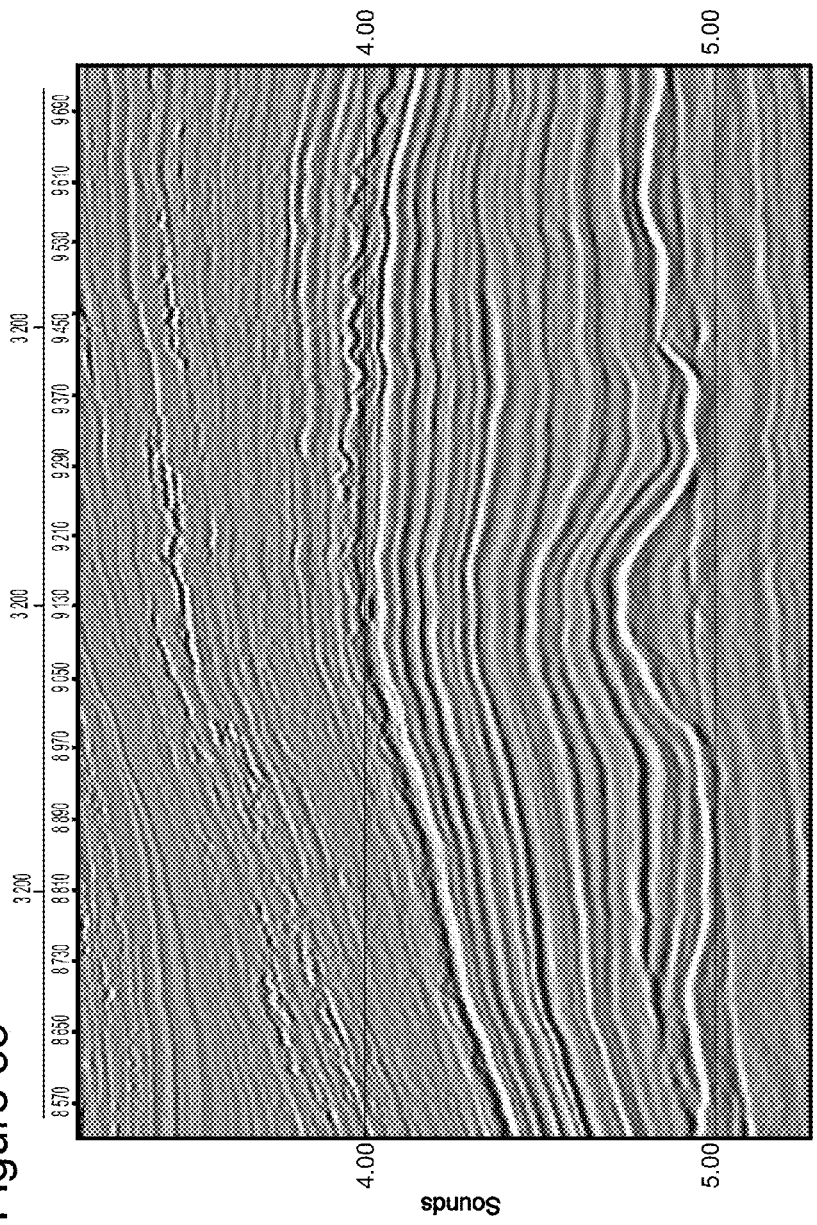
FIG. 33 illustrates a conventional PreSDM reflectivity image developed using conventional processes using the second example of actual field data in accordance with step 302 of the second method according to an embodiment.
Figure 34:
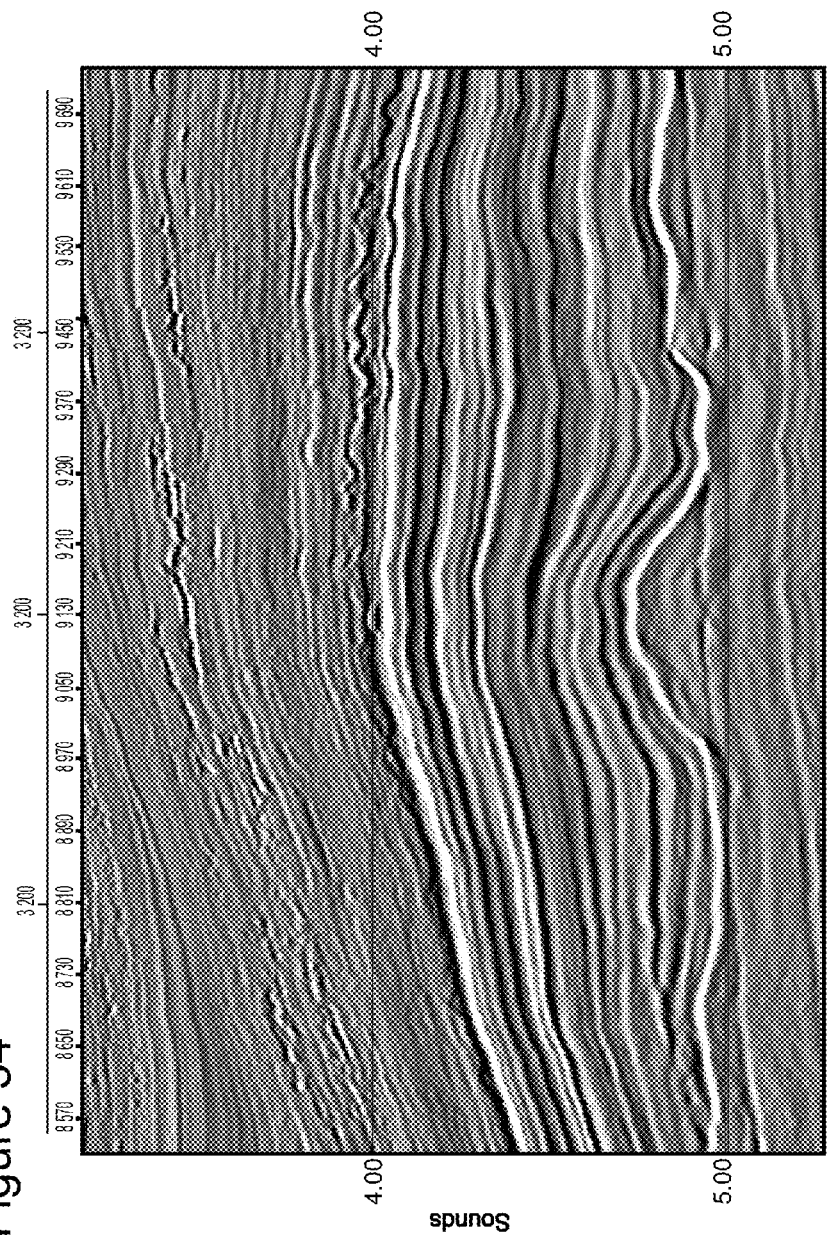
FIG. 34 illustrates an adaptive merge of the conventional PreSDM reflectivity image developed in accordance with step 302 of the second method and the LF reflectivity image developed in accordance with step 306 of the second method as performed in step 308 of the second method according to an embodiment.
Figure 35:
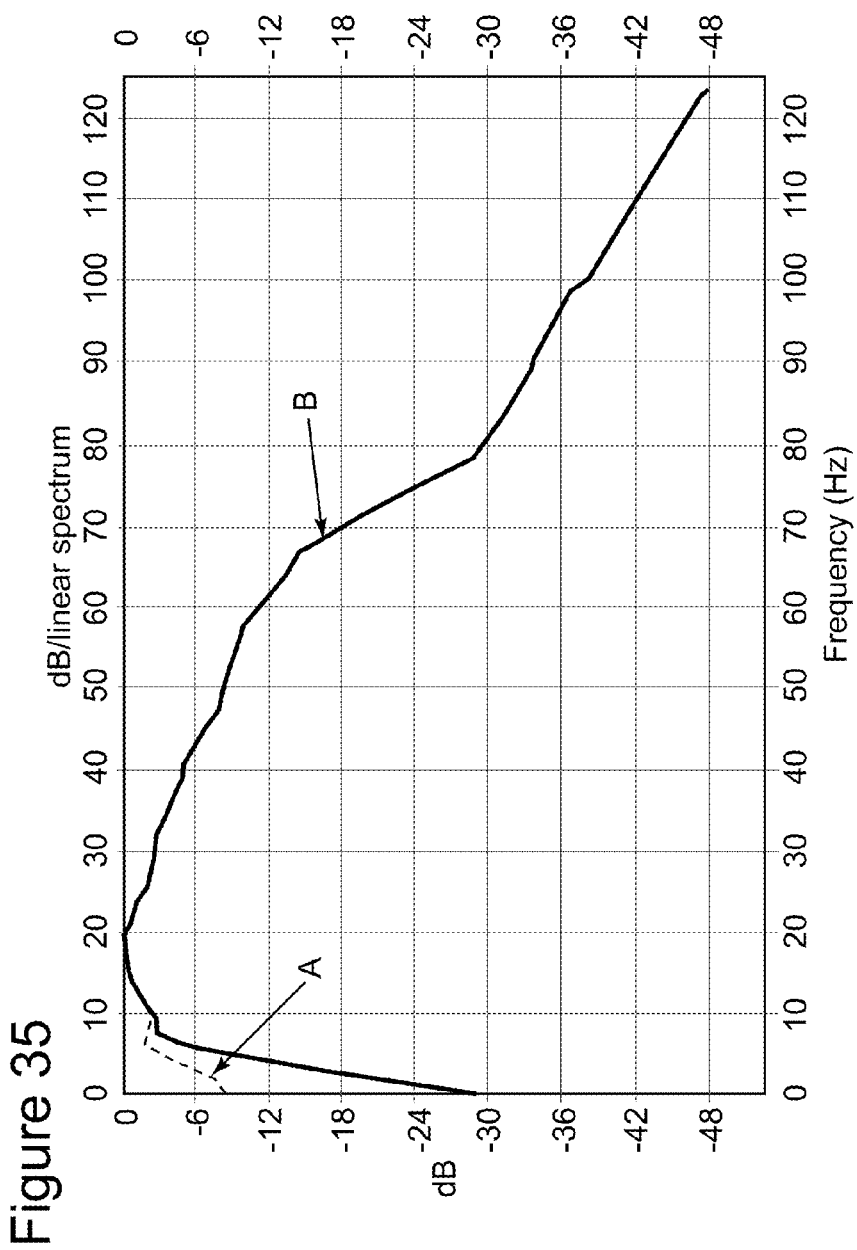
FIG. 35 illustrates a effective spectra derived seismic reflectivity and velocity data, in regards to the image shown in FIG. 32 (reflectivity derived from HD velocity) and the PreSDM reflectivity image shown in FIG. 33.

FIGS. 31 through 35 illustrate the processes and improvements of method 300 described above in regard to FIG. 19 when used on a second example of actual field data. FIG. 33 illustrates a conventional PreSDM reflectivity image developed using conventional processes using the second example of actual field data in accordance with step 302 of second method 300 according to an embodiment. FIG. 31 illustrates a HD velocity model using the second example of actual field data determined in accordance with first method 100 and step 304 of second method 300 illustrated in flowchart form in FIG. 20 according to an embodiment. FIG. 32 illustrates a LF reflectivity image developed using conventional processes using the HD velocity model data of FIG. 31 determined in accordance with step 306 of second method 300 according to an embodiment. FIG. 34 illustrates an adaptive merge of the conventional PreSDM reflectivity image developed in accordance with step 302 of second method 300 and the LF reflectivity image developed in accordance with step 306 of second method 300 as performed in step 308 of the second method according to an embodiment. FIG. 35, similarly to FIG. 26, illustrates effective spectra derived from seismic (reflectivity) and velocity data in regards to the HD reflectivity image developed using conventional processes shown in FIG. 32 and the conventional PreSDM reflectivity image developed using conventional processes shown in FIG. 33.

Figure 36:
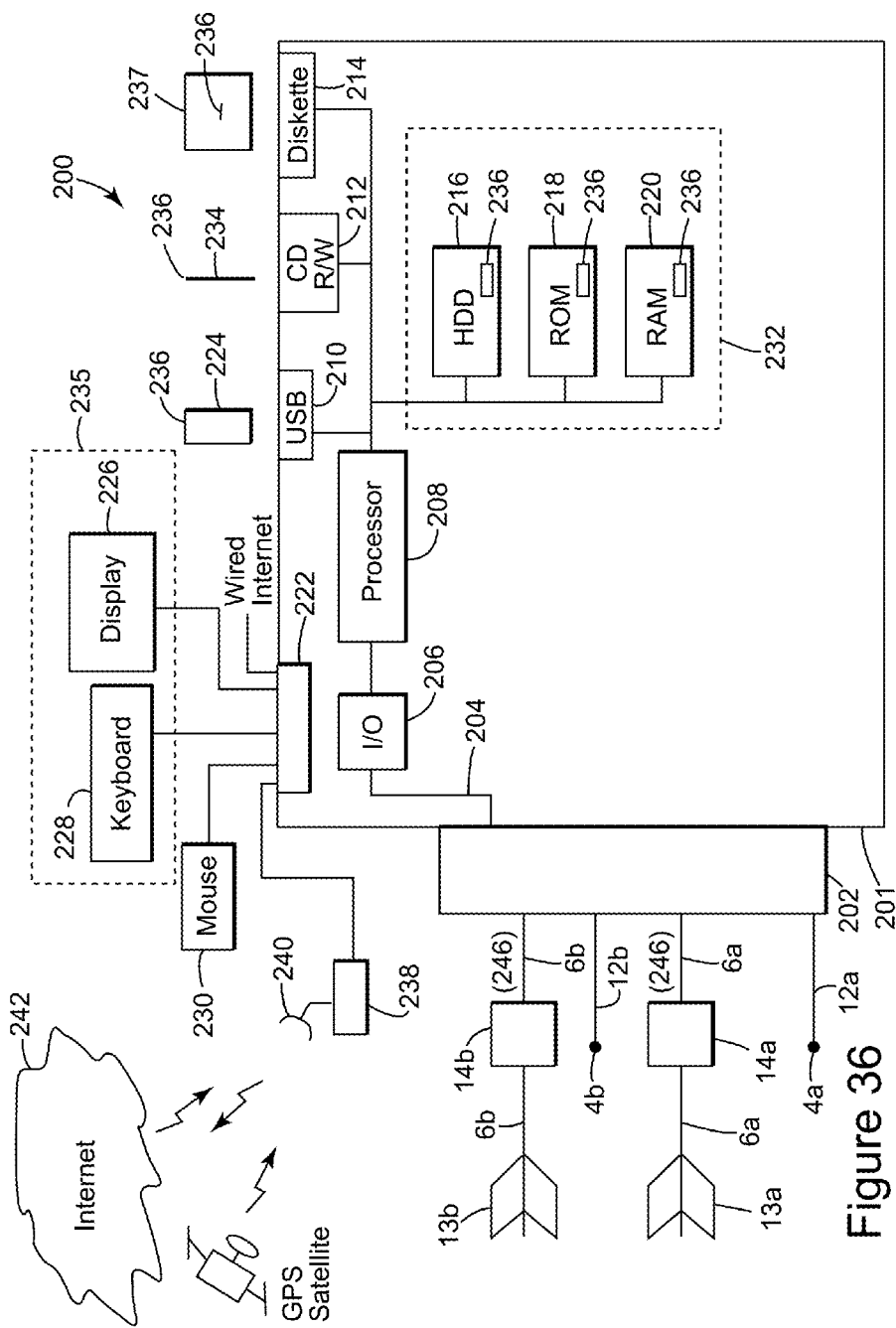
FIG. 36 illustrates a seismic data acquisition system suitable for use in implementing the method for determining a high definition tomography velocity model of a geographical area of interest according to an embodiment and suitable for use in implementing the method for developing a broadband high definition reflectivity based image for a GAI using a HD tomography velocity model and a conventional reflectivity based image for the GAI as a basis according to a further embodiment.

System for Determining a High Definition Tomography Velocity Model of a GAI and for use in Developing a Broadband High Definition Reflectivity Based Image for a GAI using a HD Tomography Velocity Model and a Conventional Reflectivity Based Image for the GAI as a Basis According to a Further Embodiment FIG. 36 illustrates a seismic data acquisition system 200 suitable for use in implementing the method for determining a high definition tomography velocity model of a geographical area of interest according to an embodiment and suitable for use in implementing the method for developing a broadband high definition reflectivity based image for a GAI using a HD tomography velocity model and a conventional reflectivity based image for the GAI as a basis according to a further embodiment. System 200 includes, among other items, server 201, source/receiver interface 202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232. Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further embodiment, system 200, being ostensibly designed for use in seismic exploration, will interface with one or more sources 4a,b and one or more receivers 14. These, as previously described, are attached to streamers 6a,b, to which are also attached birds 13a,b that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

Figure 42:
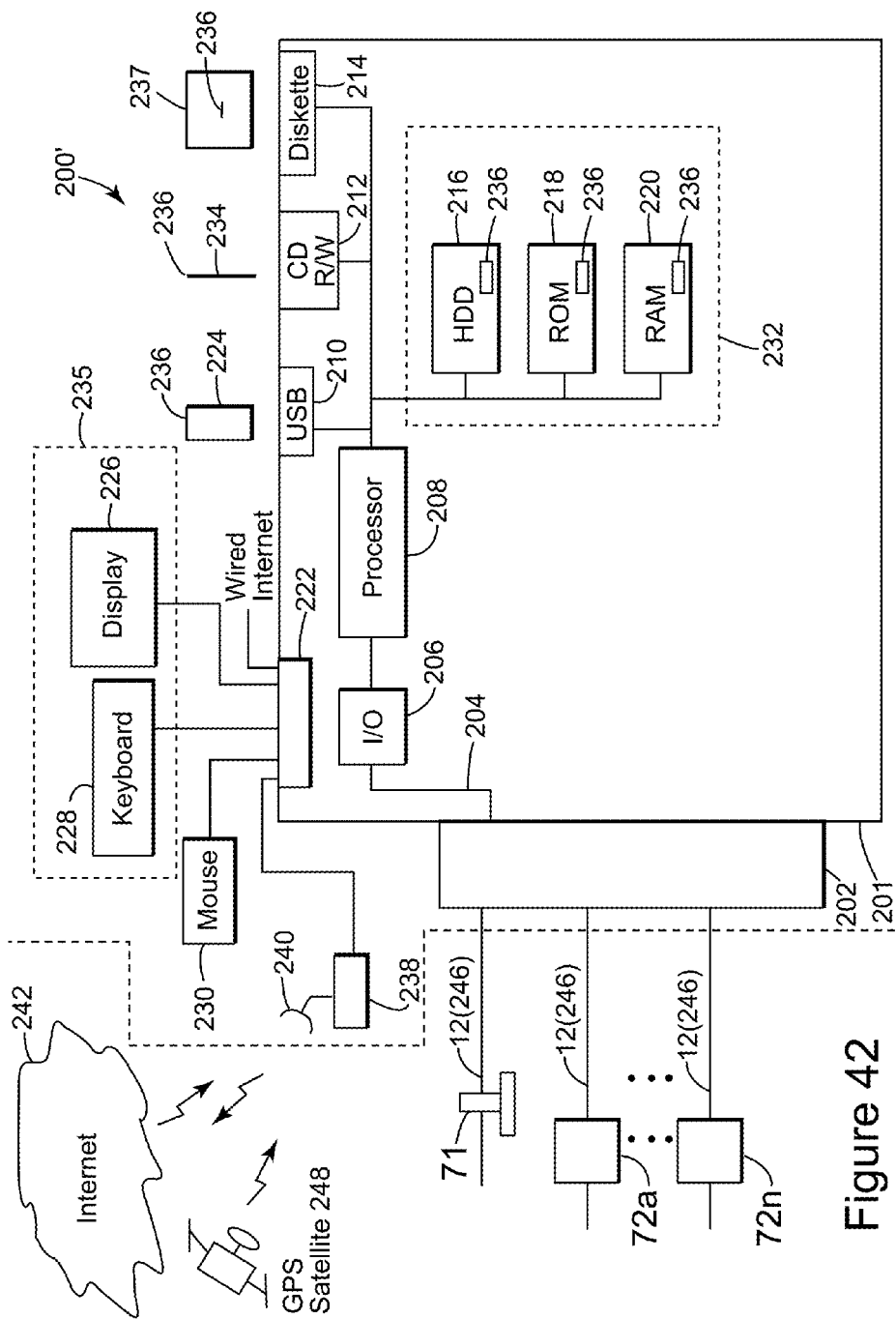
FIG. 42 illustrates a seismic data acquisition system suitable for use to implement a method for determining a high definition tomography velocity model of a geographical area of interest according to an embodiment and suitable for use in implementing the method for developing a broadband high definition reflectivity based image for a GAI using a HD tomography velocity model and a conventional reflectivity based image for the GAI as a basis according to a further embodiment.
Figure 43:
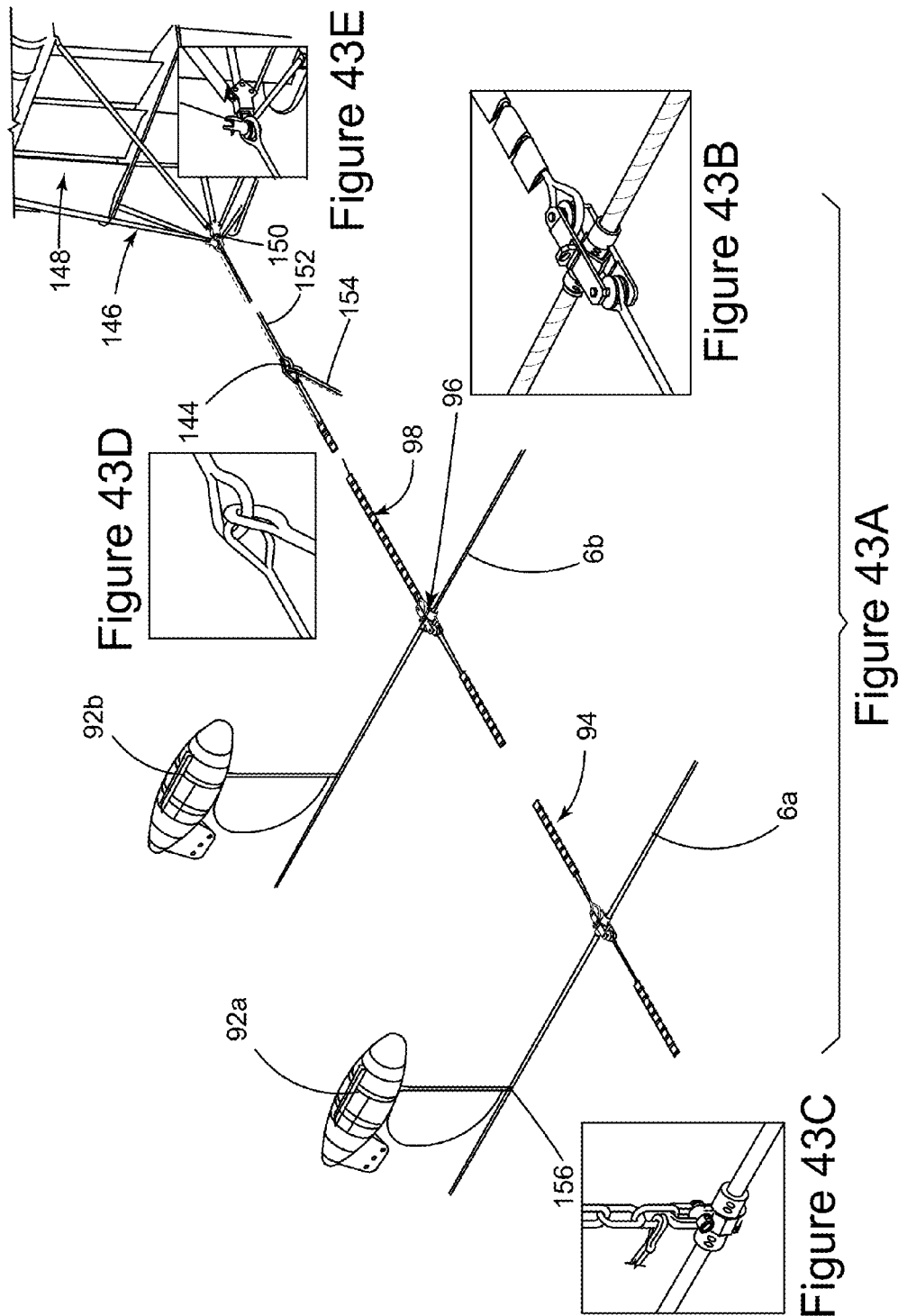
FIGS. 43A through 43E illustrate a configuration of at least two streamers for use in the marine seismic exploration system shown in FIG. 1.

FIG. 42 illustrates a portion of land seismic data acquisition system (land system) 200' that is also suitable for use to implement a method for determining a high definition tomography velocity model of a geographical area of interest according to an embodiment and suitable for use in implementing the method for developing a broadband high definition reflectivity based image for a GAI using a HD tomography velocity model and a conventional reflectivity based image for the GAI as a basis according to a further embodiment. As those of skill in the art can appreciate, while the seismic data signals themselves can represent vastly different types of underground structure, and while the signal processing can, therefore, be vastly different as a consequence, the basic equipment remains essentially the same, and thus, FIG. 42 closely resembles FIG. 36, and includes many of the same components. As a result, in fulfillment of the dual goals of clarity and brevity, a detailed discussion of land system 200' will be omitted (as like objects in FIG. 42 have been referenced similarly to those in FIG. 36), other than to note that the source of the signal source/vibrators 62 and receivers 6a-n communicate to source/receiver interface 202 via cables 80/246, but these are similar to streamers 6/246 in terms of command, control and communications functions.

Systems 200 and 200' can be used to implement method 100 and 300 for use in implementing the method for determining a high definition tomography velocity model of a geographical area of interest according to an embodiment and suitable for use in implementing the method for developing a broadband high definition reflectivity based image for a GAI using a HD tomography velocity model and a conventional reflectivity based image for the GAI as a basis according to a further embodiment. Hardware, firmware, software or a combination thereof may be used to perform the various steps and operations described herein. According to an embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 426). These storage media may be inserted into, and read by, devices such as the CD-ROM drive 414, the disk drive 412, among other types of software storage devices.

The above embodiments were discussed without specifying what type of seismic receivers 14 are used to record the seismic data. In this sense, it is known in the art to use, for a marine seismic survey, streamers 6 that are towed by one or more vessels/ships 2 and the streamers 6 include seismic receivers/detectors 14. The streamers 6 can be horizontal or slanted or having a curved profile as illustrated in FIG. 37.

Figure 37:
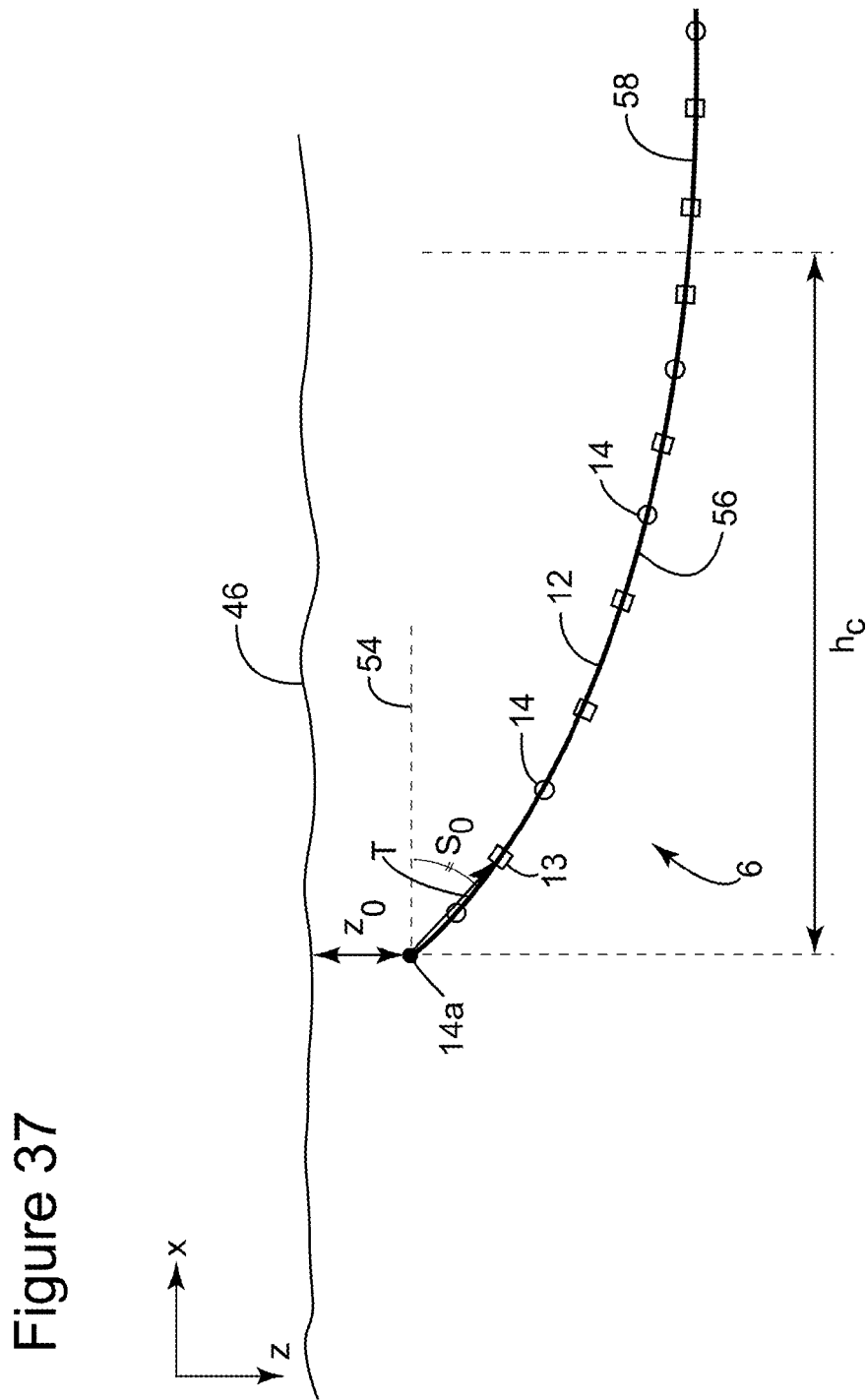
FIG. 37 illustrates a side view of another embodiment of the data acquisition system for use in an underwater seismic gathering process shown in FIG. 1, wherein a curved streamer profile is implemented according to an embodiment.

The curved streamer 6 of FIG. 37 includes a body or cable 12 having a predetermined length; plural detectors 14 provided along the body 12; and plural birds 13 provided along body 12 for maintaining the selected curved profile. Curved streamer 6 is configured to flow underwater when towed such that the plurality of detectors 14 are distributed along the curved profile. The curved profile can also be described by as parameterized curve, e.g., a curve described by (i) a depth $z_0$ of a first detector 14 (measured from the water surface 46), (ii) a slope $s_0$ of a first portion T of body 12 with an axis 54 parallel with water surface 46, and (iii) a predetermined horizontal distance $h_c$ between the first detector 14a and an end of the curved profile. It should be noted that not the entire streamer 6 has to have the curved profile. In other words, the curved profile should not be construed to always apply to the entire length of streamer 6. While this situation is possible, the curved profile may be applied only to a first portion 56 of streamer 6. In other words, streamer 6 can have (i) only a first portion 56 having the curved profile or (ii) a first portion 56 having the curved profile and a second portion 58 having a flat profile, the two portions being attached to each other.

Figure 38:
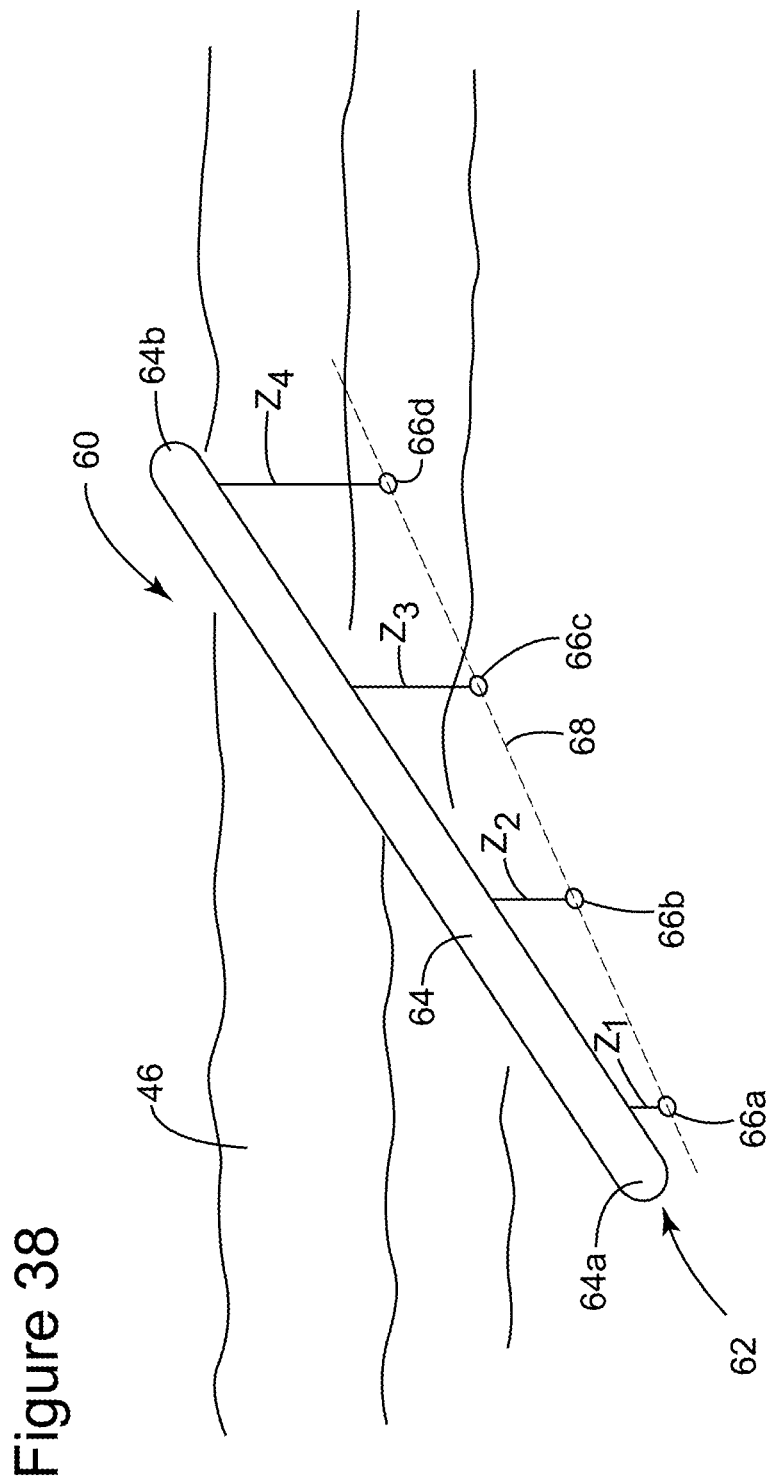
FIG. 38 illustrates a multi-level source for use with the marine seismic exploration system shown in FIG. 1 according to an embodiment.
Figure 39:
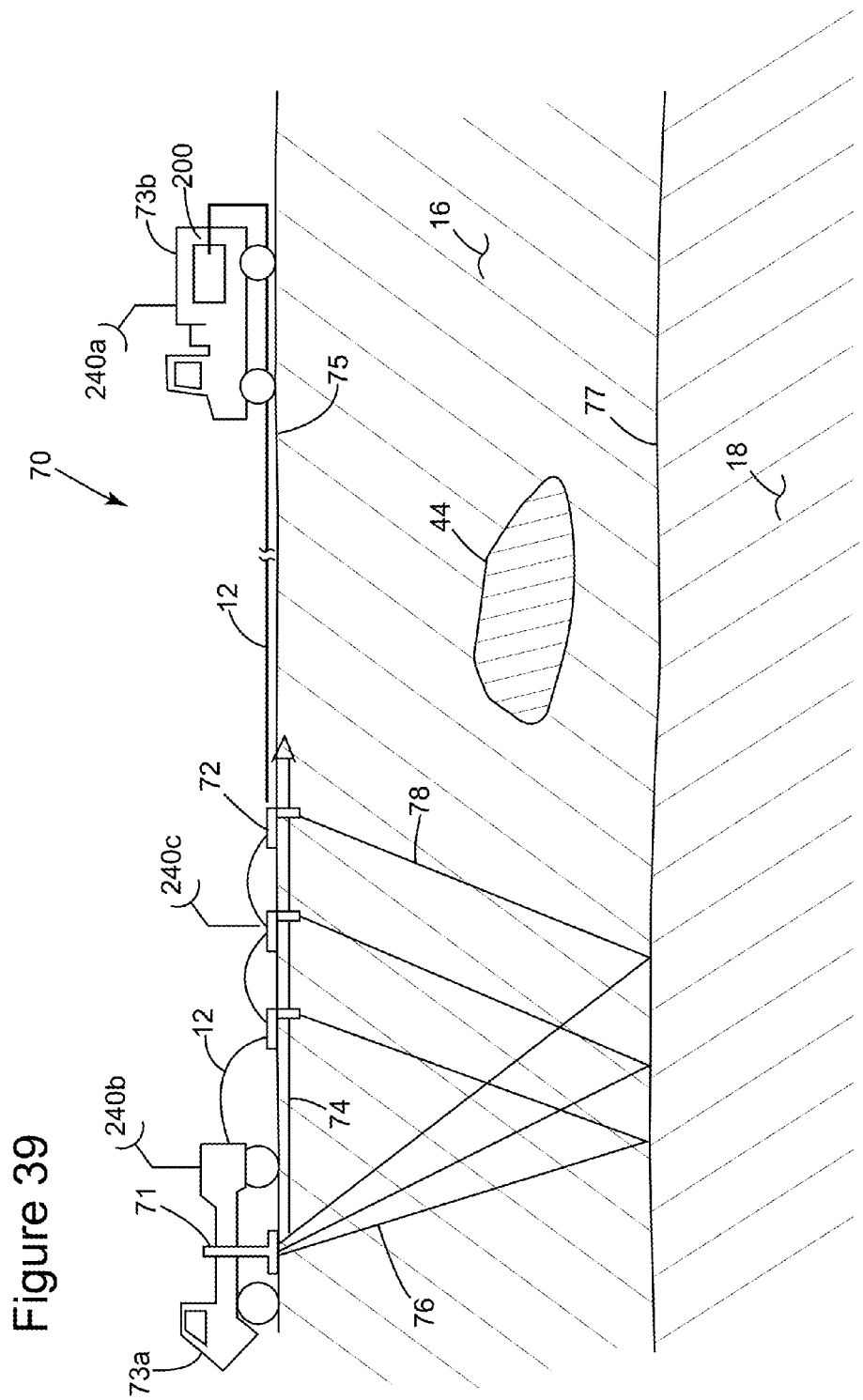
FIG. 39 depicts schematically a device for transmitting and receiving vibro-seismic waves intended for seismic exploration in a land environment.
Figure 40:
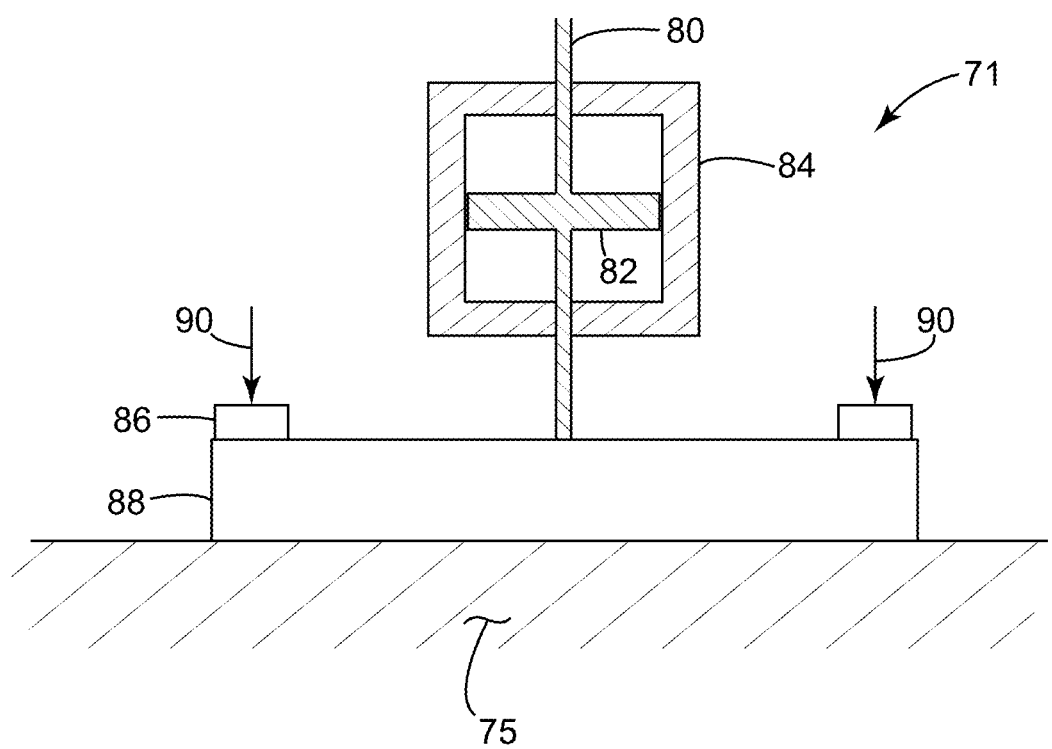
FIG. 40 illustrates a schematic block diagram of a vibratory source as shown in FIG. 39.

FIG. 38 illustrates a multi-level source for use with the marine seismic exploration system shown in FIG. 1 according to an embodiment. Further, the above embodiments may be used with multi-level source 60. FIG. 38 illustrates multi-level source 60 for use with marine seismic exploration system 10 shown in FIG. 1 according to an embodiment. Multi-level source 60 has one or more sub-arrays 62. The first sub-array 62 has a float 64 that is configured to float at the water surface 46 or underwater at a predetermined depth. Plural source points 66a-d are suspended from the float 64 in a known manner. A first source point 66a may be suspended closest to the head 64a of the float 64, at a first depth z1. A second source point 66b may be suspended next, at a second depth z2, different from z1. A third source point 66c may be suspended next, at a third depth z3, different from z1 and z2, and so on. FIG. 38 shows, for simplicity, only four source points 66a-d, but an actual implementation may have any desired number of source points 66. In one application, because source points 66 can be distributed at different depths, the source points 66 at the different depths are not simultaneously activated. In other words, the source array is synchronized, i.e., a deeper source point 66 is activated later in time (e.g., 2 ms for 3 m depth difference when the speed of sound in water is 1500 m/s) such that corresponding sound signals produced by the plural source points 66 coalesce, and thus, the overall sound signal produced by the source array appears as being a single sound signal.

The depths z1 to z4 of the source points of the first sub-array 62 can obey various relationships. In one application, the depths of source points 66 increase from head 64*a* toward the tail 64*b* of float 64, i.e., z1<z2<z3<z4. In another application, the depths of source points 66 decrease from head 64*a* to tail 64*b* of float 66. In another application, source points 66 are slanted, i.e., provided on an imaginary line 68. In still another application, line 68 is a straight line. In yet another application, line 68 is a curved line, e.g., part of a parabola, circle, hyperbola, etc. In one application, the depth of the first source point 66*a* for the sub-array 62 is about 5 m and the largest depth of the last source point 66*d* is about 8 m. In a variation of this embodiment, the depth range is between about 8.5 and about 10.5 m or between about 11 and about 14 m. In another variation of this embodiment, when line 68 is straight, the depths of the source points 66 increase by 0.5 m from a first source point to an adjacent source point. Those skilled in the art would recognize that these ranges are exemplary and these numbers may vary from survey to survey. A common feature of all these embodiments is that source points 66 have variable depths so that a single sub-array 62 exhibits multiple-level source points 66.

FIGS. 43A through 45E illustrate a configuration of at least two streamers 6*a*, 6*b* for use in the marine seismic exploration system 10 shown in FIG. 1. In FIGS. 43A through 43E, a particular configuration of first and second streamers 6*a*, 6*b* are shown that illustrate several exemplary devices that assist in maintaining directional control and stability of streamers 6 in marine exploration system 10. The devices include spread ropes 94, that separate streamers 6, bend restrictors 96 that join spread ropes 94 to streamers 6, and spurline 98, which connects streamer 6*b* to 3-Eye splice 144, which attaches to bridle block 150 and deflector 148. At least one purpose of deflector 148 is to provide a force to said plurality of streamers 6 to maintain directional stability and control. A close up view of bridle block 150 is shown in FIG. 43E. A close up view of 3-Eye splice is shown in FIG. 43D. A close up view of bend restrictor 96 is shown in FIG. 43B. Head buoys 92*a*, 92*b* provide a visual indication of the location of streamers 6, and they are connected to streamers 6 by restrictors 156, a close up view of which is shown in FIG. 43C.

Figure 44:
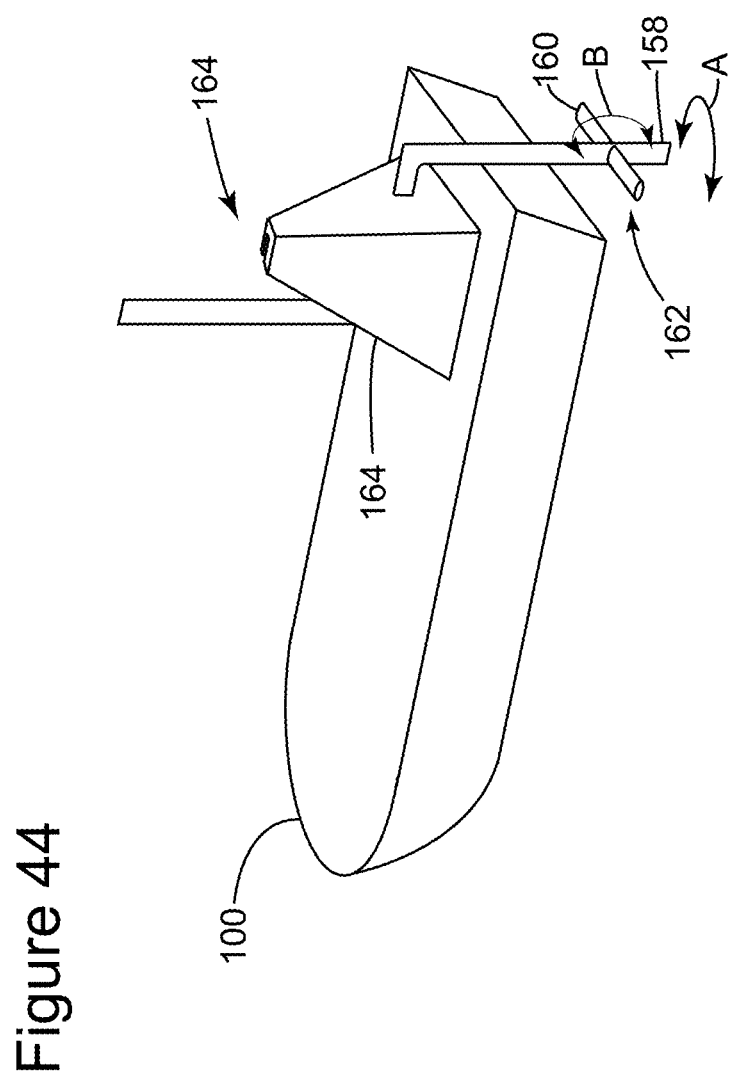
FIG. 44 illustrates a tail-buoy for use with the marine seismic exploration system shown in FIG. 1 with a ballasted keel shown in the extended position.
Figure 45:
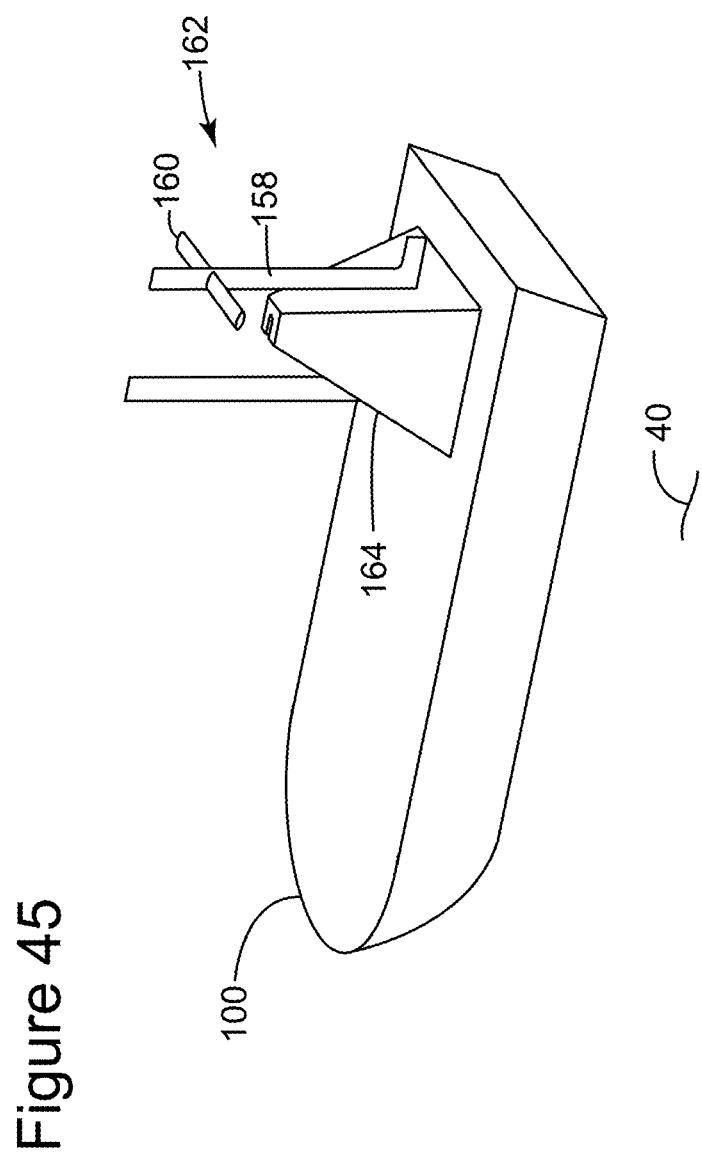
FIG. 45 illustrates a tail-buoy for use with the marine seismic exploration system shown in FIG. 1 with the ballasted keel shown in the retracted position.

FIG. 44 illustrates tail-buoy 100 for use with marine seismic exploration system 10 shown in FIG. 1 with ballasted keel 162 shown in the extended position, and FIG. 45 illustrates tail-buoy 100 for use with marine seismic exploration system 10 shown in FIG. 1 with ballasted keel shown 162 in the retracted position. The purpose of tail-buoy 100 is to (a) provide a visual indicator of the end of streamers 6, and (b) to assist in maintaining directional stability and control of streamers 6. This is especially true with Broadseis streamer configurations. In order to accomplish both functions, it is necessary to maintain directional control of tail-buoy 100 in much the same manner as is done with birds 13. Therefore, ballasted keel 162 with pitch and yaw stabilizers 160, 158 have been added. Yaw stabilizer 158 comprises most of ballasted keel 162, as it is shown to be the vertical component that can be controlled much in the same manner as a rudder for a boat. That is, when it is determined to have tail-buoy 100 turn to the left, directional controls are sent to it and received at navigation mast 154 (which contains power sources, signal processing circuitry, and so on, a detailed description of which has been omitted for the dual purposes of clarity and brevity), so that yaw stabilizer 158 turns to the left, causing the nose of tail-buoy 100 to swing to the left as water passes around yaw stabilizer 158, as those of ordinary skill in the art can appreciate. The same general principles apply when it is desired to turn tail-buoy 100 to the right. Pitch stabilizer 160 assists in maintaining direction control in much the same manner, but is used to impart a down-ward or up-ward force on the body of tail-buoy 100 with respect to the surrounding water. According to an alternate embodiment, pitch stabilizer 160 can be made fixed and not controllable by remote command. When not needed, or for storage purposes, ballasted keel 164 can be stored in a retracted position, as shown in FIG. 45. Additional motors, servos, and appropriate command and control circuitry can be provided to effectuate those functions, or the same can be accomplished manually, without additional circuitry and so on; when stored, ballasted keel 162 is folded up and a pin keeps in the retracted condition, and when placed in the water, the pin is removed, ballasted keel 162 folds down, the ballast drives ballasted keel 162 in the down position.

Online/Offline Embodiment

It should be noted in the embodiments described herein that these techniques can be applied in either an "offline", e.g., at a land-based data processing center or an "online" manner, i.e., in near real time while on-board the seismic vessel, i.e., in marine applications. For example, for determining a high definition tomography velocity model of a geographical area of interest according to an embodiment and suitable for use in implementing the method for developing a broadband high definition reflectivity based image for a GAI using a HD tomography velocity model and a conventional reflectivity based image for the GAI as a basis according to a further embodiment can occur as the seismic data is recorded on-board the seismic vessel. In this case, it is possible for broad band HD reflectivity image data to be generated as a measure of the quality of the sampling run.

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or non-volatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/non-volatile computer storage media. For example, the processor can access a hard disk drive that reads from or writes to non-removable, non-volatile magnetic media, a magnetic disk drive that reads from or writes to a removable, non-volatile magnetic disk, and/or an optical disk drive that reads from or writes to a removable, non-volatile optical disk, such as a CD-ROM or other optical media. Other removable/non-removable, volatile/non-volatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a source array, computer software, and a method for determining a high definition tomography velocity model of a geographical area of interest according to an embodiment and suitable for use in implementing the method for developing a broadband high definition reflectivity based image for a GAI using a HD tomography velocity model and a conventional reflectivity based image for the GAI as a basis according to a further embodiment. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

We claim:

1. A method for determining a broadband high definition (HD) reflectivity based image for a geographical area of interest (GAI), the method comprising:
   receiving acquired seismic data for the GAI;
   generating a conventional reflectivity image of a subsurface of the GAI based on the acquired seismic data for the GAI;
   generating a high frequency (HF) velocity model of the GAI based on HD tomography and the acquired seismic data;
   converting the HF velocity model into a low frequency (LF) reflectivity image of the subsurface of the GAI; and
   adaptively merging the LF reflectivity image with the conventional reflectivity image to form a broadband HD reflectivity image of the subsurface of the GAI.

2. The method according to claim 1, wherein the conventional reflectivity image is bandwidth limited.

3. The method according to claim 1, wherein the LF reflectivity image is a PreStack Depth Migration image.

4. The method according to claim 1, wherein the LF reflectivity image is a PreStack Time Migration image.

5. The method according to claim 1, wherein the steps of generating a conventional reflectivity image and generating a HF velocity model include
   (a) generating a series of seismic signals by a plurality of source transmitters; and
   (b) receiving raw data at a plurality of receivers based on the generated series of seismic signals and saving the same as said acquired seismic data.

6. The method according to claim 1, wherein the step of adaptively merging comprises:
   determining amplitude as a function of frequency for the LF reflectivity image to create a first spectral signal;
   determining amplitude as a function of frequency for the conventional reflectivity image to a create a second spectral signal;
   determining portions of overlapping frequency between the LF reflectivity image and the conventional reflectivity image with respect to the first and second spectral signals; and
   combining said first and second spectral images in said overlapping frequency portions along with said first and second spectral images in non-overlapping frequency portions to generate said broadband HD reflectivity image.

7. The method according to claim 1, wherein the step of adaptively merging comprises:
   combining the LF reflectivity image and the conventional reflectivity image using spectral balancing techniques.

8. The method according to claim 7, wherein the step of combining comprises:
   summing the LF reflectivity image and the conventional reflectivity image in the frequency range wherein an overlap occurs in regard to a spectral content of each of the LF reflectivity image and the conventional reflectivity image.

9. The method according to claim 8, wherein the step of summing comprises:
   determining amplitude as a function of frequency for the LF reflectivity image to create a first spectral signal;
   determining amplitude as a function of frequency for the conventional reflectivity image to a create a second spectral signal;
   performing spectral shaping of the first spectral signal and of the second spectral signal to enable summation of the first and second spectral signals;
   geometrical shaping the LF reflectivity image and the conventional reflectivity image to further facilitate summation of the LF reflectivity image and the conventional reflectivity image; and
   summing the LF reflectivity image and the conventional reflectivity image based on the outputs of the spectral shaping and warping steps.

10. The method according to claim 9, wherein the step of geometrical shaping comprises:
    compensating at least one of or both time and space variant differences in the LF reflectivity image and conventional reflectivity image in order to sum the LF reflectivity image and the conventional reflectivity image.

11. The method according to claim 9, wherein the step of spectral shaping comprises:
    determining a regularity of properties of a combined signal and using said determined regularity to combine the LF reflected image and the conventional reflectivity image that have different phase and amplitude spectra.

12. The method according to claim 9, wherein the step of geometrical shaping comprises:
    image shaping the LF reflectivity image and the conventional reflectivity image using at least one of warping, shaping, and morphing.

13. The method according to claim 1, wherein the step of generating a high frequency (HF) velocity model of the GAI based on the acquired seismic data comprises:
    obtaining a conventional velocity model of the GAI using said acquired seismic data;
    determining density of the conventional velocity model data;
    determining spatial wavelengths of the velocity variations within each of the velocity model layers;
    determining a size of the velocity model grid mesh according to the determined velocity model layer data density and spatial wavelengths of the velocity variations within each of the velocity model layers;
    developing residual move out data and dip data from the velocity model grid mesh according to the size of the velocity model grid mesh;
    eliminating residual move out and dip data outliers that exceed a first parameter to generate a first set of retained residual move out and dip data; and
    inverting the first set of retained residual move out and dip data to generate the HF velocity model of the GAI.

14. The method according to claim 1, further comprising:
    displaying the broadband HD reflectivity image of the GAI.

15. A system for determining a broadband high definition (HD) reflectivity based image for a geographical area of interest (GAI), the system comprising:
    an interface configured to receive acquired seismic data; and
    a processor connected to the interface and configured to—
       generate a conventional reflectivity image of a subsurface of the GAI based on the acquired seismic data for the GAI,
       generate a high frequency (HF) velocity model of the GAI based on HD tomography and the acquired seismic data,
       convert the HF velocity model into a low frequency (LF) reflectivity image of the subsurface of the GAI, and adaptively merge the LF reflectivity image with the conventional reflectivity image to form a broadband HD reflectivity image of the subsurface of the GAI.

16. The system according to claim 15, wherein the conventional reflectivity image is bandwidth limited.

17. The system according to claim 15, wherein the LF reflectivity image is a PreStack Depth Migration image.

18. The system according to claim 15, wherein the LF reflectivity image is a PreStack Time Migration image.

19. The system according to claim 15, further comprising:
a plurality of transmitters configured to generate a series of seismic signals;
a plurality of receivers configured to receive raw data based on the generated series of seismic signals; and
a memory configured to save the received raw data as said acquired seismic data.

20. The system according to claim 15, wherein when the processor adaptively merges the LF reflectivity image with the conventional reflectivity image, the system is further configured to—
determine amplitude as a function of frequency for the LF reflectivity image to create a first spectral signal,
determine amplitude as a function of frequency for the conventional reflectivity image to a create a second spectral signal,
determine portions of overlapping frequency between the LF reflectivity image and the conventional reflectivity image with respect to the first and second spectral signals, and
combine said first and second spectral images in said overlapping frequency portions along with said first and second spectral images in non-overlapping frequency portions to generate said broadband HD reflectivity image.

21. The system according to claim 15, wherein when the processor adaptively merges the LF reflectivity image with the conventional reflectivity image, the system is further configured to—
combine the LF reflectivity image and the conventional reflectivity image using spectral balancing techniques.

22. The system according to claim 21, wherein when the processor combines the LF reflectivity image and the conventional reflectivity image using spectral balancing techniques, the processor is further configured to—
sum the LF reflectivity image and the conventional reflectivity image in the frequency range wherein an overlap occurs in regard to a spectral content of each of the LF reflectivity image and the conventional reflectivity image.

23. The system according to claim 22, wherein when the processor sums the LF reflectivity image with the convention reflectivity image, the processor is further configured to—
determine amplitude as a function of frequency for the LF reflectivity image to create a first spectral signal,
determine amplitude as a function of frequency for the conventional reflectivity image to a create a second spectral signal, perform spectral shaping of the first spectral signal and of the second spectral signal to enable summation of the first and second spectral signals,
geometrically shape the LF reflectivity image and the conventional reflectivity image to further facilitate summation of the LF reflectivity image and the conventional reflectivity image, and
sum the LF reflectivity image and the conventional reflectivity image based on the outputs of the spectral shaping and warping steps.

24. The system according to claim 23, wherein when the processor geometrically shapes the LF reflectivity image and the conventional reflectivity image, the processor is further configured to—
compensate at least one of or both time and space variant differences in the LF reflectivity image and conventional reflectivity image in order to sum the LF reflectivity image and the conventional reflectivity image.

25. The system according to claim 23, wherein when the processor spectrally shapes the first spectral signal and of the second spectral signal, the processor is further configured to—
determine a regularity of properties of a combined signal and using said determined regularity to combine the LF reflected image and the conventional reflectivity image that have different phase and amplitude spectra.

26. The system according to claim 23, wherein when the processor geometrically shapes the LF reflectivity image and the conventional reflectivity image, the processor is further configured to—
image shape the LF reflectivity image and the conventional reflectivity image using at least one of warping, shaping, and morphing.

27. The system according to claim 15, wherein when the processor generates a high frequency (HF) velocity model of the GAI based on the acquired seismic data, the processor is further configured to—
obtain a conventional velocity model of the GAI using said acquired seismic data,
determine density of the conventional velocity model data;
determine spatial wavelengths of the velocity variations within each of the velocity model layers,
determine a size of the velocity model grid mesh according to the determined velocity model layer data density and spatial wavelengths of the velocity variations within each of the velocity model layers,
develop residual move out data and dip data from the velocity model grid mesh according to the size of the velocity model grid mesh,
eliminate residual move out and dip data outliers that exceed a first parameter to generate a first set of retained residual move out and dip data, and
invert the first set of retained residual move out and dip data to generate the HF velocity model of the GAI.

28. The system according to claim 15 further comprising:
a display configured to display the broadband HD reflectivity image of the GAI.

* * * * *